(12) United States Patent
Line et al.

(10) Patent No.: US 10,442,326 B2
(45) Date of Patent: *Oct. 15, 2019

(54) SEATING ASSEMBLY WITH SUSPENSION

(71) Applicant: Ford Global Technologies, LLC, Dearborn, MI (US)

(72) Inventors: Johnathan Andrew Line, Northville, MI (US); Spencer Robert Hoernke, Dundas (CA); Jimmy Moua, Canton, MI (US); Adam Ewel, Royal Oak, MI (US); Corbin Shea Johnston, Winnipeg (CA); Robert Damerow, Garden City, MI (US); Paul Iacoban, Dearborn, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/810,745

(22) Filed: Nov. 13, 2017

(65) Prior Publication Data
US 2019/0143854 A1    May 16, 2019

(51) Int. Cl.
    *B60N 2/34*    (2006.01)
    *B60N 2/20*    (2006.01)
    *B60N 2/10*    (2006.01)

(52) U.S. Cl.
    CPC ............. *B60N 2/34* (2013.01); *B60N 2/10* (2013.01); *B60N 2/20* (2013.01)

(58) Field of Classification Search
    CPC ... B60N 2/34; B60N 2/10; B60N 2/20; B60N 2/2236; B60N 2/502; B60N 2/68; B60N 2002/022

USPC ... 297/316, 13, 16.1, 34, 40, 44, 63, 64, 65, 297/66, 158.4, 159.1, 315, 324, 350
See application file for complete search history.

(56) References Cited

U.S. PATENT DOCUMENTS

| | | | |
|---|---|---|---|
| 2,576,343 A | 11/1951 | Hibbard et al. | |
| 3,268,922 A | 8/1966 | Moxley | |
| 3,722,011 A | 3/1973 | Miller | |
| 3,902,755 A | 9/1975 | Sirot | |
| 4,175,297 A | 11/1979 | Robbins et al. | |
| 4,709,961 A | 12/1987 | Hill | |
| 4,832,400 A | 5/1989 | Aoki et al. | |
| 4,977,633 A | 12/1990 | Chaffee | |
| 5,125,631 A * | 6/1992 | Brodersen | B60N 2/509 248/421 |
| 5,567,011 A | 10/1996 | Sessini | |
| 5,960,495 A | 10/1999 | Hsu et al. | |
| 5,988,748 A | 11/1999 | Morrison et al. | |

(Continued)

FOREIGN PATENT DOCUMENTS

DE    1020151116487 A1    4/2016
JP    H0775608 A    3/1995

*Primary Examiner* — Mark R Wendell
(74) *Attorney, Agent, or Firm* — Vichit Chea; Price Heneveld LLP

(57) ABSTRACT

A lifter mechanism for an edge of a seat cushion includes a bracket pivotable about a transverse bar. The bracket includes a forward lever and a rearward portion. The forward lever is coupled to a channel within a flange of a seat suspension. The rearward portion is coupled to a linkage. The linkage is coupled to a seatback. The forward lever raises an edge of the seat suspension upon the seatback pivoting to a predetermined reclined position.

20 Claims, 31 Drawing Sheets

(56) References Cited

U.S. PATENT DOCUMENTS

| | | |
|---|---|---|
| 6,073,291 A | 6/2000 | Davis |
| 6,135,558 A | 10/2000 | Behrens et al. |
| 6,183,033 B1 | 2/2001 | Arai et al. |
| 6,273,810 B1 | 8/2001 | Rhodes, Jr. et al. |
| 6,439,636 B1 | 8/2002 | Kuo |
| 6,565,153 B2 | 5/2003 | Hensel et al. |
| 6,793,469 B2 | 9/2004 | Chung |
| 7,000,276 B2 | 2/2006 | Chaffee |
| 7,025,420 B2 | 4/2006 | Guinea Pena et al. |
| 7,055,904 B2 | 6/2006 | Skelly et al. |
| 7,127,762 B1 | 10/2006 | Lau |
| 7,380,301 B2 | 6/2008 | Chung |
| 7,424,760 B2 | 9/2008 | Chaffee |
| 7,475,944 B2 | 1/2009 | Griepentrog et al. |
| 7,478,448 B2 | 1/2009 | Boso et al. |
| 7,644,982 B2 | 1/2010 | Paluch |
| 7,780,230 B2 | 8/2010 | Serber |
| 7,845,718 B1 | 12/2010 | Bosstick |
| 7,857,381 B2 | 12/2010 | Humer et al. |
| 7,934,762 B2 | 5/2011 | Hollenbeck et al. |
| 8,201,890 B1 | 6/2012 | Nagoaka Mihara |
| 8,528,978 B2 | 9/2013 | Purpura et al. |
| 10,065,535 B1 | 9/2018 | Line et al. |
| 2002/0195846 A1 | 12/2002 | Masuda et al. |
| 2003/0140416 A1 | 7/2003 | Olenick et al. |
| 2008/0073951 A1 | 3/2008 | Hattori et al. |
| 2010/0201167 A1 | 8/2010 | Wieclawski |
| 2011/0083753 A1 | 4/2011 | Chaffee |
| 2012/0175930 A1 | 7/2012 | Jovicevic |
| 2014/0203611 A1 | 7/2014 | Kondrad et al. |
| 2014/0203614 A1 | 7/2014 | Line et al. |
| 2015/0296995 A1 | 10/2015 | Krim et al. |
| 2017/0000685 A1 | 1/2017 | Rohr et al. |
| 2017/0119169 A1 | 5/2017 | Krim et al. |

\* cited by examiner

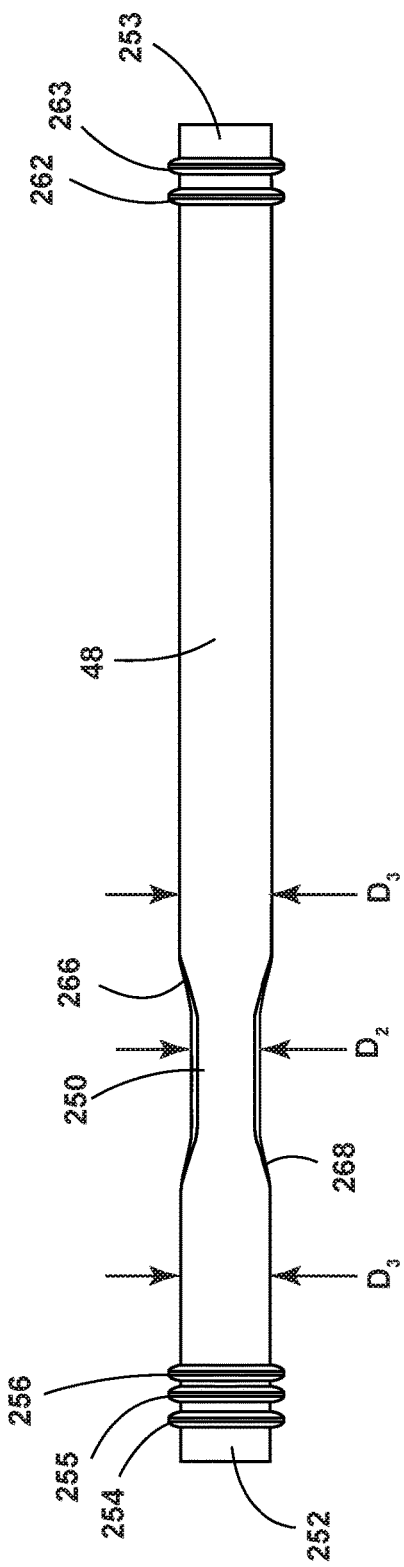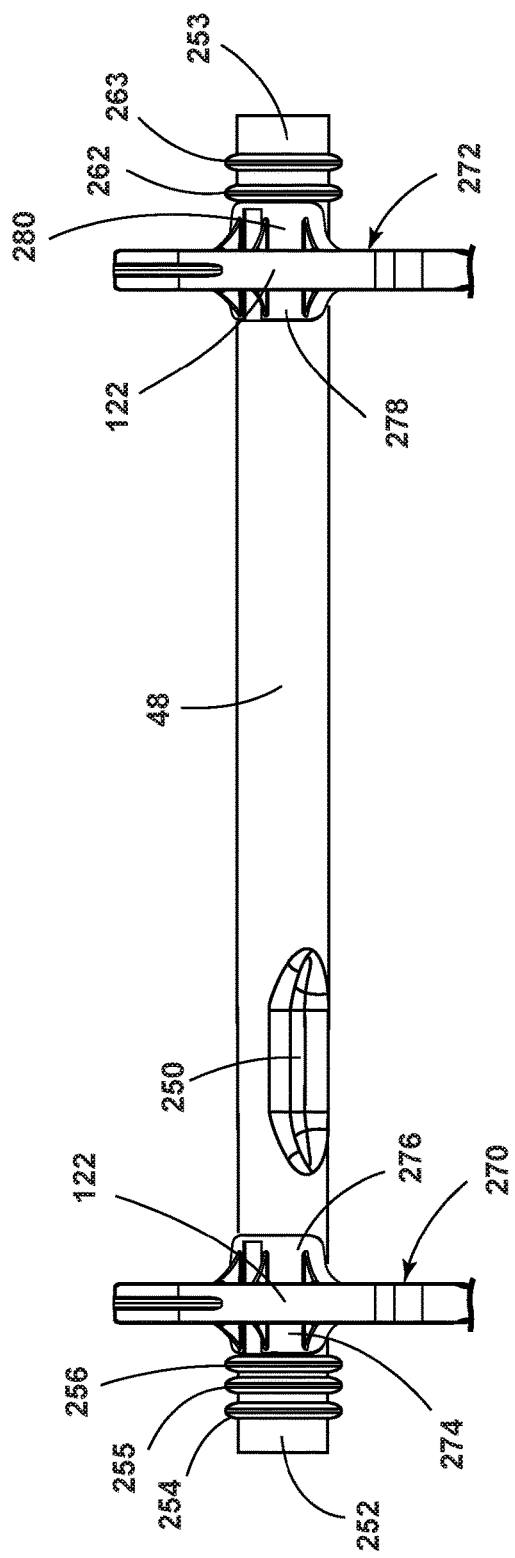

SEATING ASSEMBLY WITH SUSPENSION

FIELD OF THE INVENTION

The present invention generally relates to an apparatus and method for providing a motor vehicle seating assembly adapted to assume a first configuration to provide conventional support and restraint in the operation of a motor vehicle, and adapted to assume a second configuration to provide a relatively level supine platform upon which an occupant might lie when the motor vehicle is not in operation and, more particularly, to a hip lift mechanism that lifts the rear edge of the lower seating structure to the level of the seatback when in the fully reclined position.

BACKGROUND OF THE INVENTION

Motor vehicle seating assemblies provided in modern motor vehicles are primarily designed to provide a support platform designed to accommodate a motor vehicle occupant in a sitting or reclined position, providing support for the motor vehicle occupant's back by which the motor vehicle occupant can safely operate the motor vehicle or travel within the motor vehicle in a comfortable and pleasant manner. Another function of motor vehicle seating assemblies is to assist in restraining the occupant in the event of an impact or rollover event. For example, in the case of a frontal impact event, the motor vehicle seating assembly is particularly adapted to restrain the occupant within a prescribed range of positions so that the motor vehicle's active and passive restraint systems can operate appropriately.

In the case of the lower seating structure of the motor vehicle seating assembly, the lower seating structure is typically downwardly inclined in a rearward direction toward the bite line of the motor vehicle seating assembly to provide an ergonomic seating platform. This configuration also serves to assist in positioning the H-point of the motor vehicle occupant of the motor vehicle seating assembly, whereby in the event of a frontal impact event, the forward momentum of the motor vehicle occupant generates a force against the lower seating assembly, which tends to retain the motor vehicle occupant in a position, where the active restraint system comprising the seatbelt assembly and the passive restraint system comprising one or more airbags can be most effectively employed.

However, modern motor vehicle seating assemblies typically do not address the needs of motor vehicle occupants when the vehicle is parked and the motor vehicle occupant wants to rest or sleep. Due to the mechanisms widely in use to provide a seatback recline feature, the seatback may cause significant discomfort when it moves from a driving/use design position to a resting/sleeping position. In particular, existing reclining features tend to create a substantial vertical gap between the lower seating structure and the seatback with the seatback in the fully reclined position. Likewise, the seatback often fails to provide sufficient upper back support when in the fully reclined position. Features are needed to make the motor vehicle occupant more comfortable and relaxed. Mechanisms that provide a relatively level supine platform and adequate upper back support are desired.

SUMMARY OF THE INVENTION

According to one aspect of the present invention, a lifter mechanism for an edge of a seat cushion includes a bracket pivotable about a transverse bar. The bracket includes a forward lever and a rearward portion. The forward lever is coupled to a channel within a flange of a seat suspension. The rearward portion is coupled to a linkage. The linkage is coupled to a seatback. The forward lever raises an edge of the cushion assembly upon the seatback pivoting to a predetermined reclined position.

Embodiments of the first aspect of the invention can include any one or a combination of the following features:
- each of the seat cushion and the seatback have an exposed surface and wherein the exposed surfaces of each of the seat cushion and the seatback substantially occupy the same horizontal plane when the seatback is in a fully reclined position;
- the linkage has a slot including an upper end and a lower end and wherein the rearward portion of the bracket is coupled to a pin received within the slot, wherein the lower end of the slot being proximate with the pin corresponds to an upright position of the seatback and wherein the upper end of the slot being in initial contact with the pin corresponds to the predetermined reclined position between the upright position and the fully reclined position;
- pivoting the seatback between the predetermined reclined position and a fully reclined position urges the upper end of the slot against the pin to rotate the bracket and raise the forward lever and the edge of the cushion assembly upwardly;
- the forward lever is coupled to a projection and wherein the projection is slidably received within the channel of the seat suspension;
- the seat suspension is in a substantially horizontal position in the predetermined reclined position and wherein pivoting the seatback from the predetermined reclined position to a fully reclined position urges a projection to slide from a forward portion of a channel to a rearward portion of the channel to rotate a forward edge of the seat suspension about a pivotable coupling to raise the rearward portion of the seat suspension; and/or
- the predetermined reclined position is about 55.5° relative to a vertical plane.

According to another aspect of the present invention, a seating assembly for a motor vehicle includes a lower seating structure including a seat frame, a seat suspension disposed proximate the seat frame, a pivot bar laterally extending between rearward portions of the seat frame, and a lower seat pivot mount disposed at a rearward end of the seat frame, and a cushion assembly supported by the seat suspension. The seatback is pivotable between an upright position and a fully reclined position operably coupled with the lower seating structure. The seatback has a seatback pivot mount at a lower portion thereof that is operably coupled with the lower seat pivot mount. A hip lifter mechanism includes a hip lifter pivot bracket operably coupled with and rotationally disposed relative to the pivot bar. The hip lifter mechanism further includes a slotted linkage coupled to the lower portion of a seatback frame. The hip lifter pivot bracket includes a forward lever and a rearward portion. The forward lever of the hip lifter pivot bracket is operably connected to an edge of the seat suspension via a channel within a flange to raise the edge of the seat suspension upwardly upon the seatback pivoting to a predetermined reclined position between the upright position and the fully reclined position. A rearward portion is coupled to the slotted linkage.

Embodiments of the second aspect of the invention can include any one or a combination of the following features:

the seat suspension includes a pair of lateral opposed suspension frame members and a suspension cross member extending between the pair of lateral opposed suspension frame members, the pair of lateral opposed suspension frame members including nubs for securing a mat to the pair of lateral opposed suspension members;

an inwardly extending member protrudes from at least one of the pair of lateral opposed suspension frame members and wherein the inwardly extending member is attached to the lower seating structure;

the inwardly extending member includes a circular opening that is pivotably coupled to a circular member of the lower seating structure;

the seat suspension includes a suspension frame, a fastener coupled to the suspension frame wherein the fastener attaches the suspension frame to the lower seating structure, and a mat that is coupled to the suspension frame;

the suspension frame has a rectangular shape and wherein the suspension frame includes nubs for receiving attachments of the mat;

the suspension frame comprises a wire overmolded with a glass-filled nylon;

the nubs are hook-shaped and formed of glass-filled nylon;

each of the lower seating structure and seatback have an exposed surface and wherein the exposed surfaces of each of the lower seating structure and the seatback substantially occupy the same horizontal plane when the seatback is in the fully reclined position;

the linkage includes a slot and the slot has an upper end and a lower end and the rearward portion of the hip lifter pivot bracket includes a pin received within the slot, wherein the lower end of the slot being proximate with the pin corresponds to the upright position of the seatback and wherein the upper end of the slot being in initial contact with the pin corresponds to the predetermined reclined position between the upright position and the fully reclined position;

a pair of hip lifter mechanisms, wherein each of a pair of hip lifter mechanisms is disposed proximate one of the pair of opposed lateral lower seat frame members; and/or the hip lifter mechanism raises the seat suspension and the cushion assembly between 45 to 70 mm between the upright position and the fully reclined position of the seatback.

According to another aspect of the present invention, a seating assembly forms a substantially horizontal plane for an exposed surface of each of a lower seat cushion and a seatback cushion of a seatback. The seating assembly includes a lifter mechanism for a rearward edge of the lower seat cushion that includes a bracket pivotable about a transverse bar fixedly mounted to a frame assembly for a seat. The bracket includes a forward lever operably connected to the lower seat cushion and a rearward portion. A link is pinned at a first end to a seatback and the link is pinned at a second end to the rearward portion. The rearward edge of the lower seat cushion is initially raised by the forward lever upon the seatback pivoting to a predetermined reclined position. The rearward edge of the lower seat cushion is raised to the substantially horizontal plane upon the seatback pivoting to a fully reclined position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 28 is an elevational view of the transverse bar;

FIG. 29 is a second elevational view of the transverse bar with two pivot brackets.

DETAILED DESCRIPTION OF THE PREFERRED EMBODIMENTS

Figure 1:
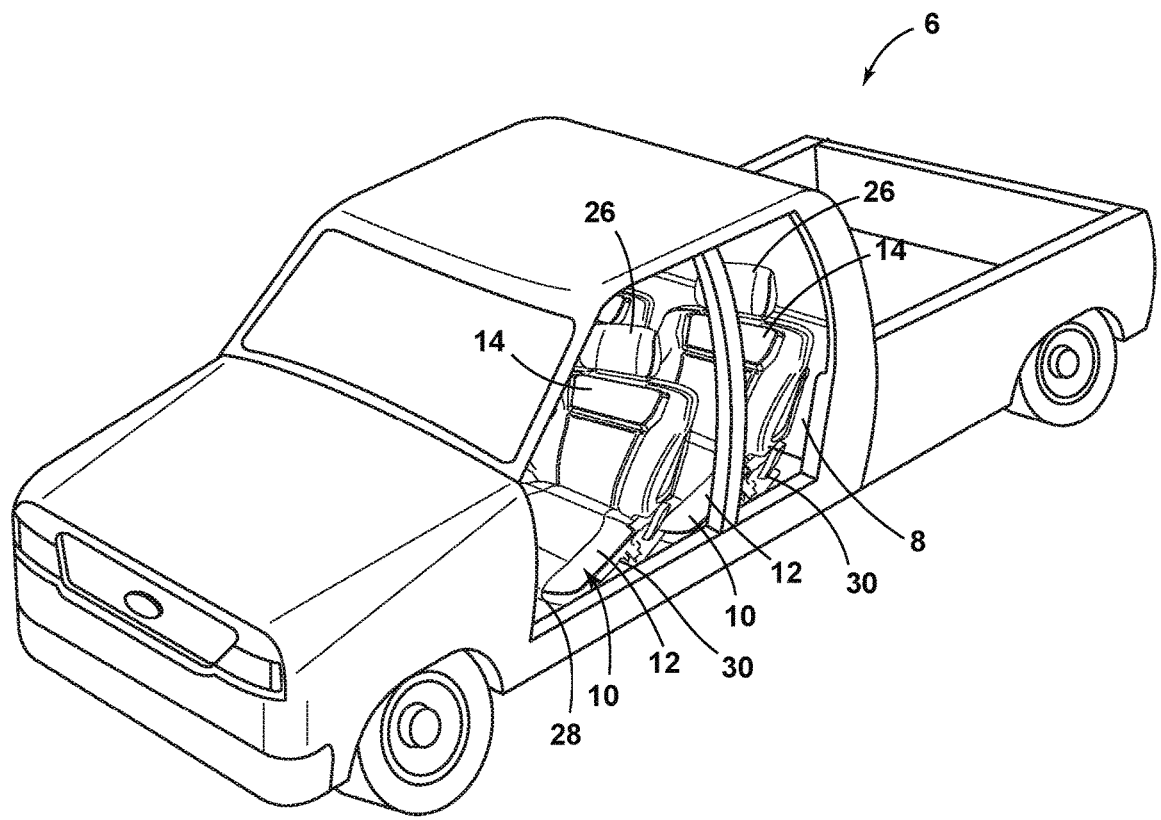
FIG. 1 is a front side perspective view of an automotive seating assembly installed in a motor vehicle in accordance with the present disclosure, wherein the seatback of the front seating assembly is in the upright position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
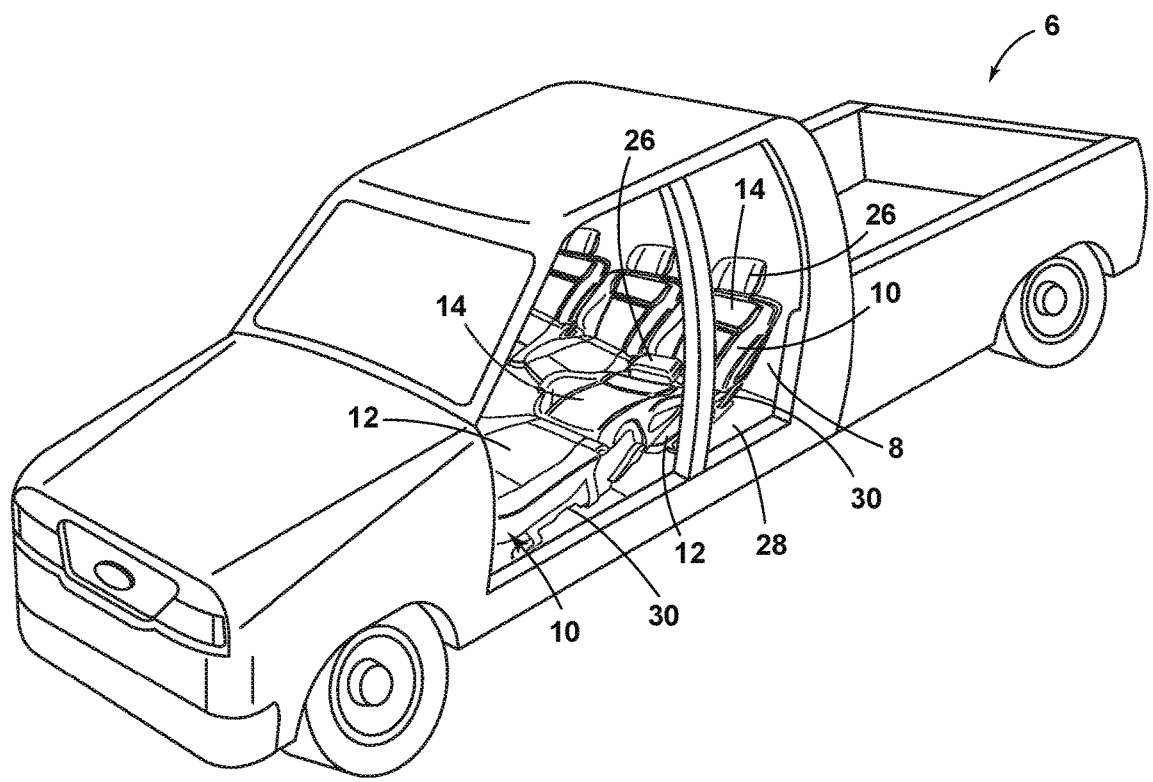
FIG. 2 is a front side perspective view of the automotive seating assembly of FIG. 1, wherein the seatback of the front seating assembly is in the fully reclined position.

Referring to FIGS. 1-30, reference numeral 10 generally designates a vehicle seating assembly for use in a vehicle cabin 8 of a motor vehicle 6. The motor vehicle seating assembly 10 includes a lower seating structure 12 pivotably coupled to a raised seatback 14. As shown in FIGS. 1-2, the motor vehicle seating assembly 10 is generally configured for use in a variety of motor vehicles 6 in a front driver seat, a front passenger seat, or a rear seat of the motor vehicle 6 and generally includes the aforementioned lower seating structure 12 and raised seatback 14. A head restraint 26 is also mounted to the top of the raised seatback 14. The motor vehicle seating assembly 10 may be configured to be mounted on a support surface, such as a floor pan 28 of the vehicle 6. A seat track assembly 30 may be coupled to the lower seating structure 12 to facilitate fore and aft positioning of the motor vehicle seating assembly 10, as is known. The motor vehicle seating assembly 10 is generally designed for the comfort of a motor vehicle occupant, as well as to accommodate and protect the motor vehicle occupant during a collision event.

Figure 3B:
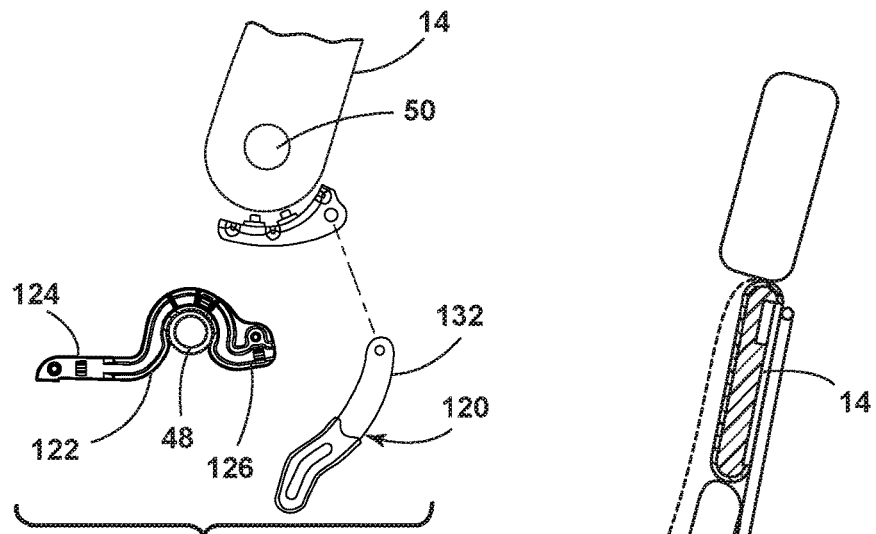
FIG. 3B is a side schematic view of the hip lifter mechanism of the automotive seating assembly of FIG. 1, wherein the seatback is in the upright position.
Figure 3A:
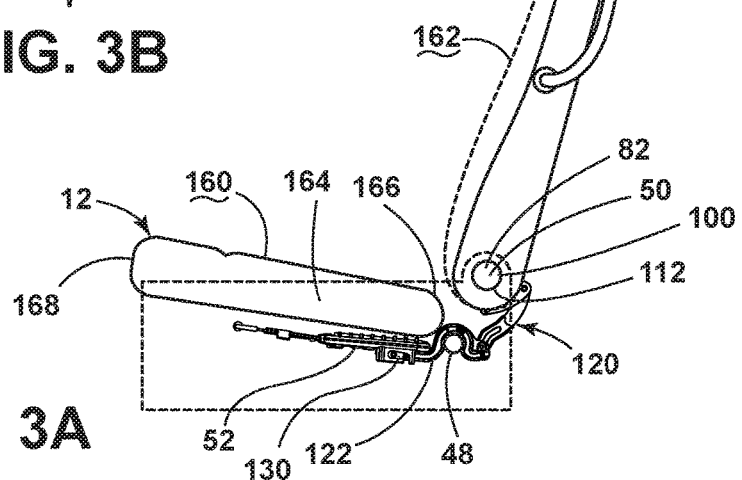
FIG. 3A is a side view of the hip lifter mechanism of the automotive seating assembly of FIG. 1, wherein the seatback is in the upright position.
Figure 4:
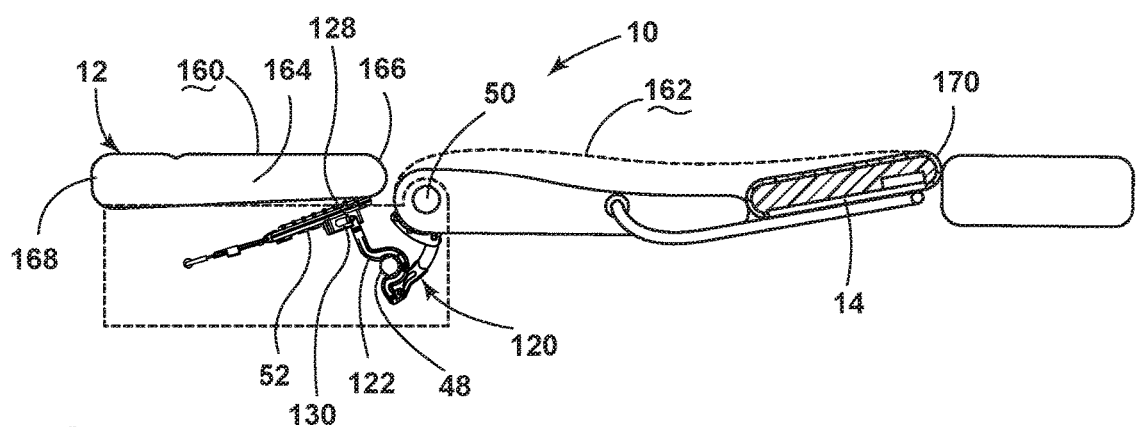
FIG. 4 is a side view of the hip lifter mechanism of the automotive seating assembly of FIG. 1, wherein the seatback is in the fully reclined position.

Referring to FIGS. 3A-4, a hip lifter mechanism 120 for an edge 166 of a seat cushion (cushion assembly 164 in the depicted aspect) includes a bracket 122 pivotable about a transverse bar (pivot bar 48 in the depicted aspect). The bracket 122 includes a forward lever 124 and a rearward portion 126. The forward lever 124 is coupled to a channel 130 within a flange 200 of a seat suspension (secondary suspension 52 in the depicted aspect). The rearward portion 126 is coupled to a linkage 132. The linkage 132 is coupled to a seatback 14. The forward lever 124 raises an edge 166 of the cushion assembly 164 upon the seatback 14 pivoting to a predetermined reclined position.

Figure 7:
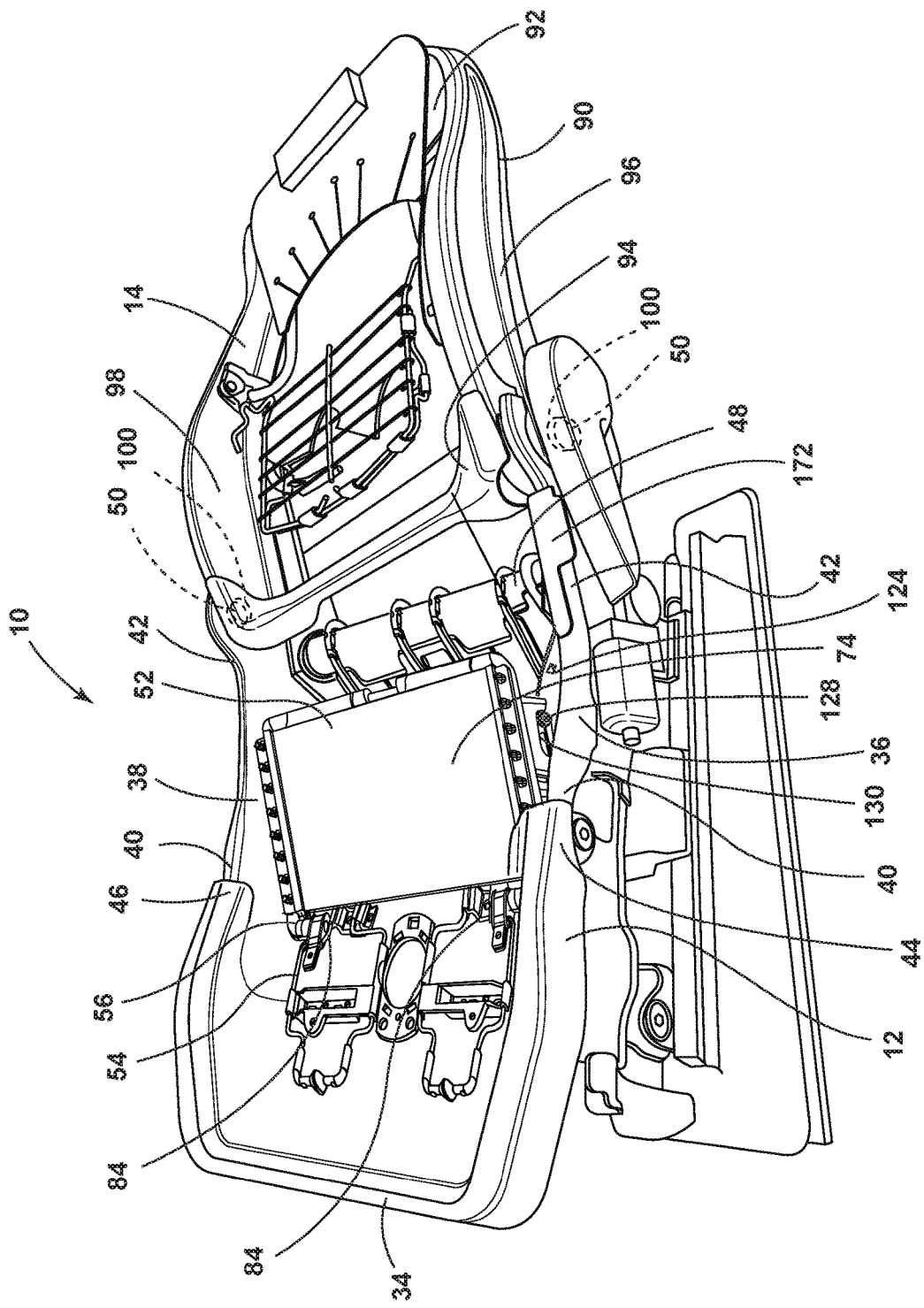
FIG. 7 is a side perspective view of the hip lifter mechanism with the link installed, wherein the seatback is in the fully reclined position.
Figure 7A:
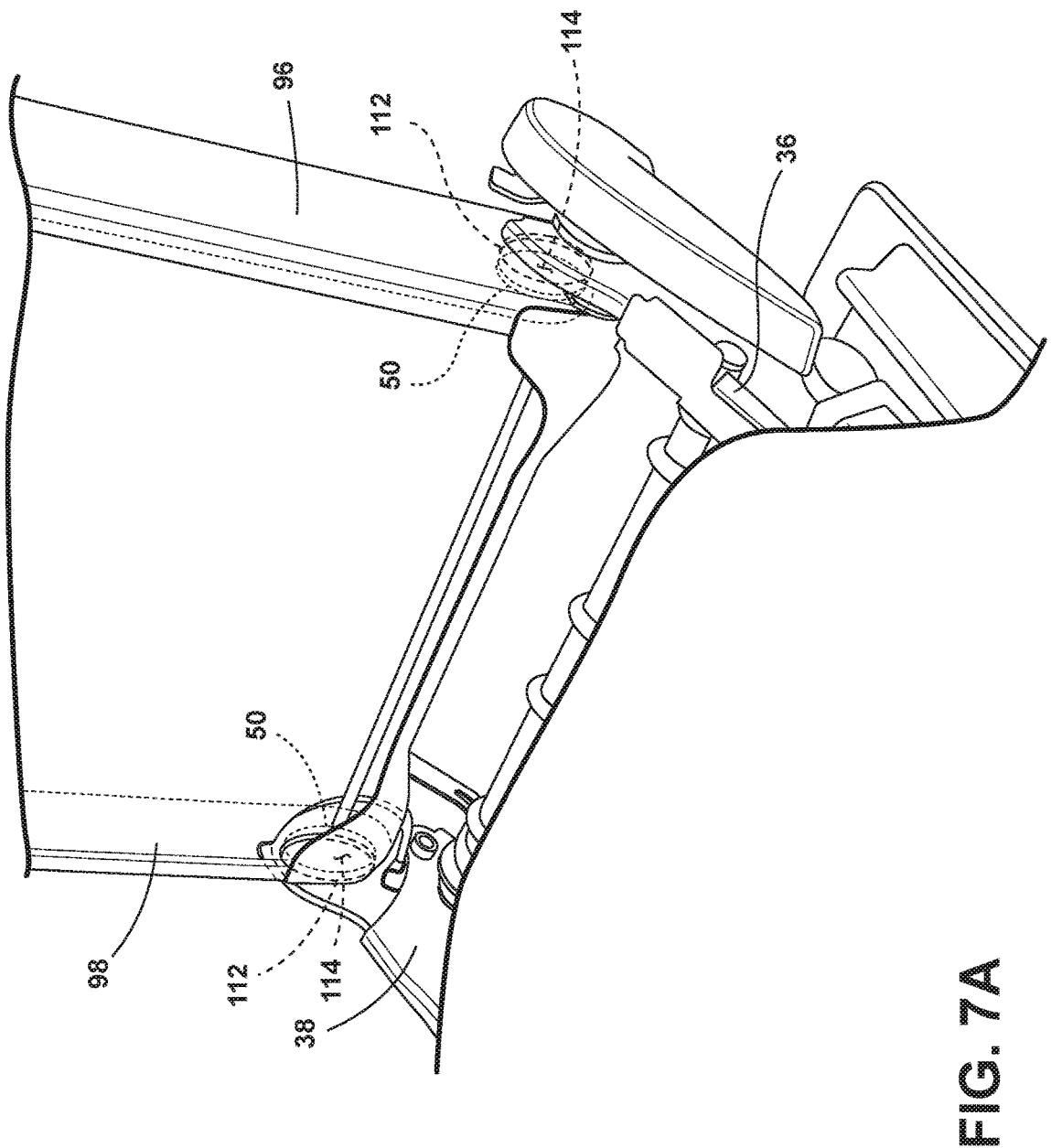
FIG. 7A is a side perspective view of the coupling of the seatback frame to the lower seat.

FIG. 7 shows the seating assembly 10 in the fully reclined position. The lower seating structure 12 includes a forward seat pan 34 and a pair of opposed lateral lower seat frame members 36, 38 having forward and rearward ends 40, 42 attached to opposed lateral edges 44, 46 of the forward seat pan 34 at the forward ends 40 of the opposed lateral lower seat frame members 36, 38. A pivot bar 48 extends laterally between and is fixedly attached to the rearward ends 42 of the opposed lateral lower seat frame members 36, 38. Preferably, the forward seat pan 34 and opposed lateral lower seat frame members 36, 38 are fabricated from relatively low-weight and high-strength metal components, such as high-strength steel or aluminum. A lower seat pivot mount 50 is mounted at the rearward end 42 of the opposed lateral lower seat frame members 36, 38.

Figure 8:
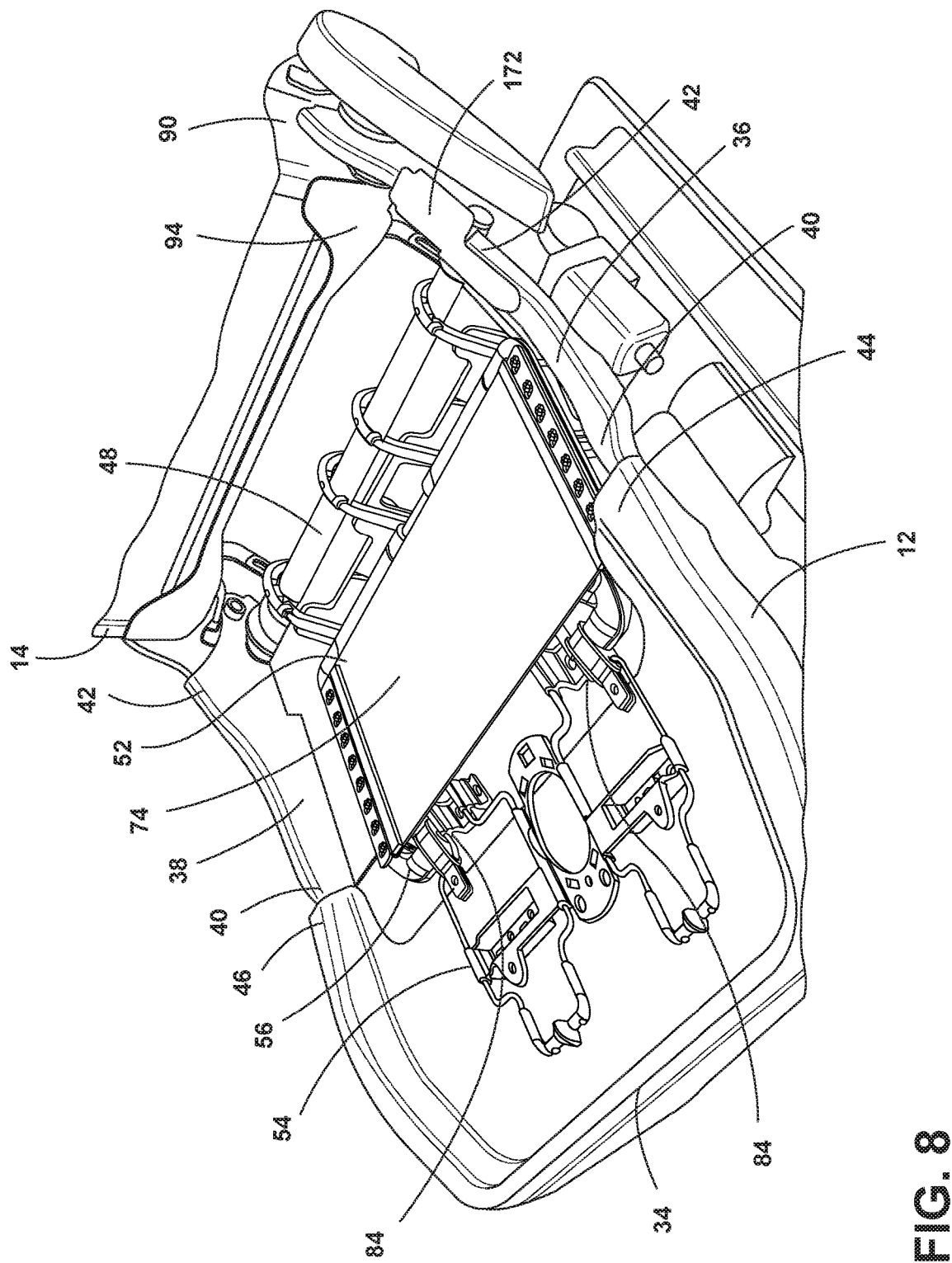
FIG. 8 is a partial front view of the hip lifter mechanism and cushion suspension system of the automotive seating assembly of FIG. 1.
Figure 9:
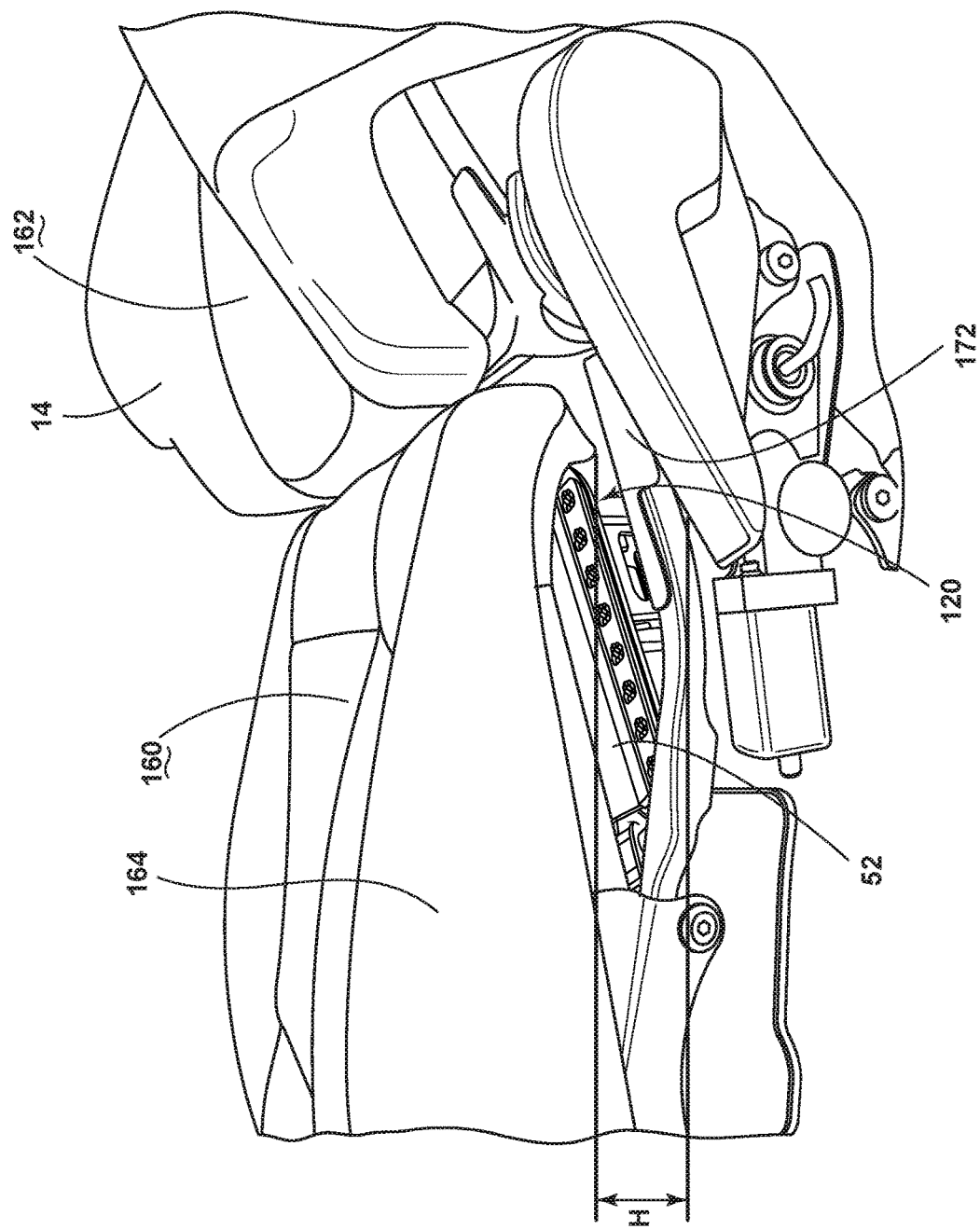
FIG. 9 is a side perspective view of the seating assembly of the automotive seating assembly of FIG. 1.

Referring to FIGS. 7-9, a secondary suspension 52 is attached to the primary suspension 54 and adjustably supported between the pair of opposed lateral lower seat frame members 36, 38. The secondary suspension 52 includes a frame 56 and a mat 74.

The seatback 14 is pivotable between an upright position (FIGS. 1, 3A, 3B, 6A, 30) and a fully reclined position (FIGS. 2, 4, 6, 6D, 7) and is operably coupled with the lower seating structure 12. The seatback 14 includes a frame 90 having an upper transverse cross member 92, a lower transverse cross member 94, and a pair of opposed lateral seatback frame members 96, 98 vertically extending between the upper and lower transverse cross members 92, 94. Each of the pair of opposed lateral seatback frame members 96, 98 has a seatback pivot mount 100 at a lower portion thereof that is operably coupled with the lower seat pivot mount 50. Preferably, the seatback pivot mounts 100 on each of the pair of opposed lateral seatback frame members 96, 98 include a circular recess 112, and the lower seat pivot mount 50 mounted on each of the pair of opposed lateral lower seat frame members 36, 38 comprises a circular projection 114 received within the circular recess 112.

Figure 5:
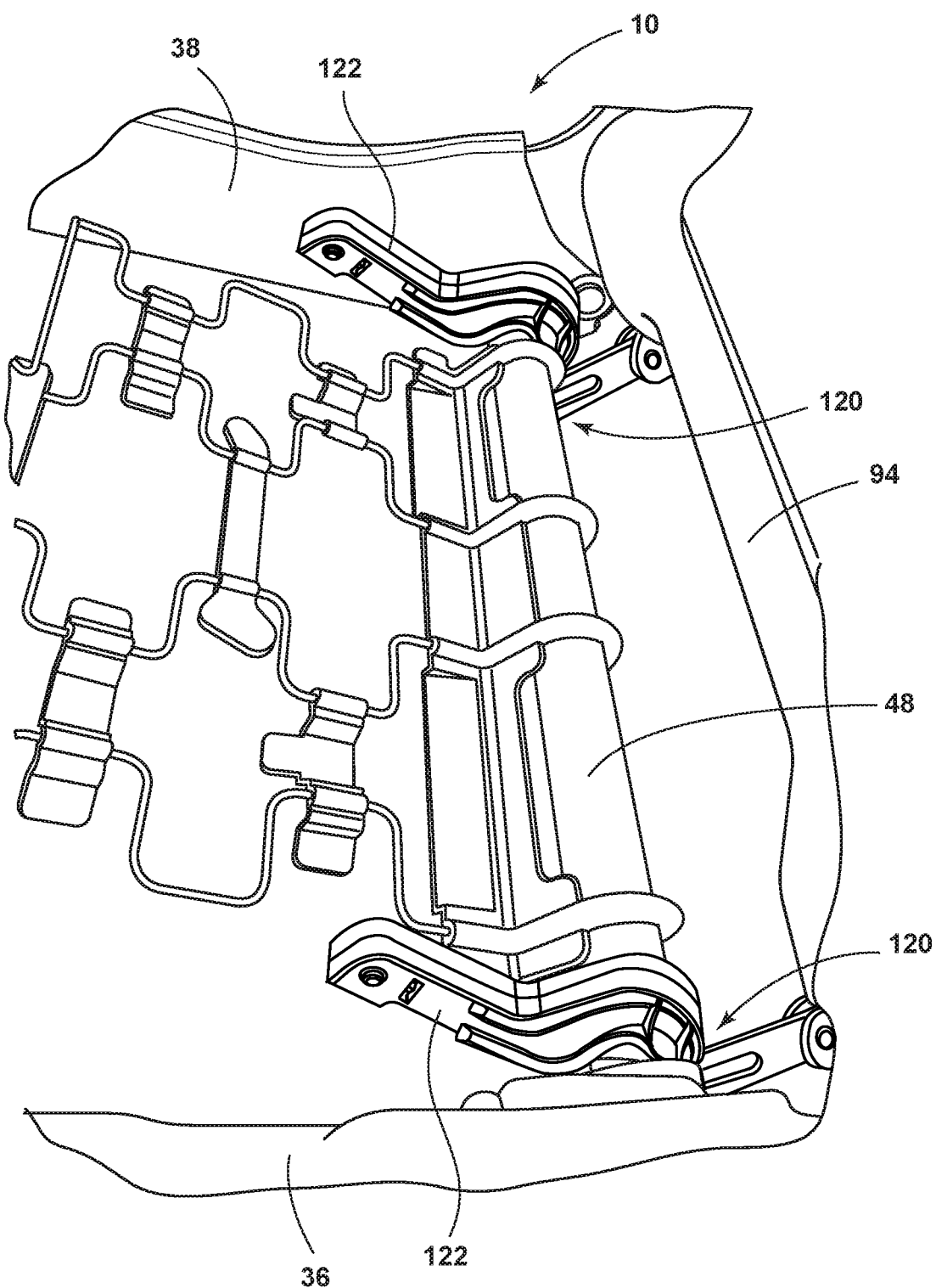
FIG. 5 is a side perspective view of the hip lifter mechanism of the automotive seating assembly of FIG. 1.
Figure 6:
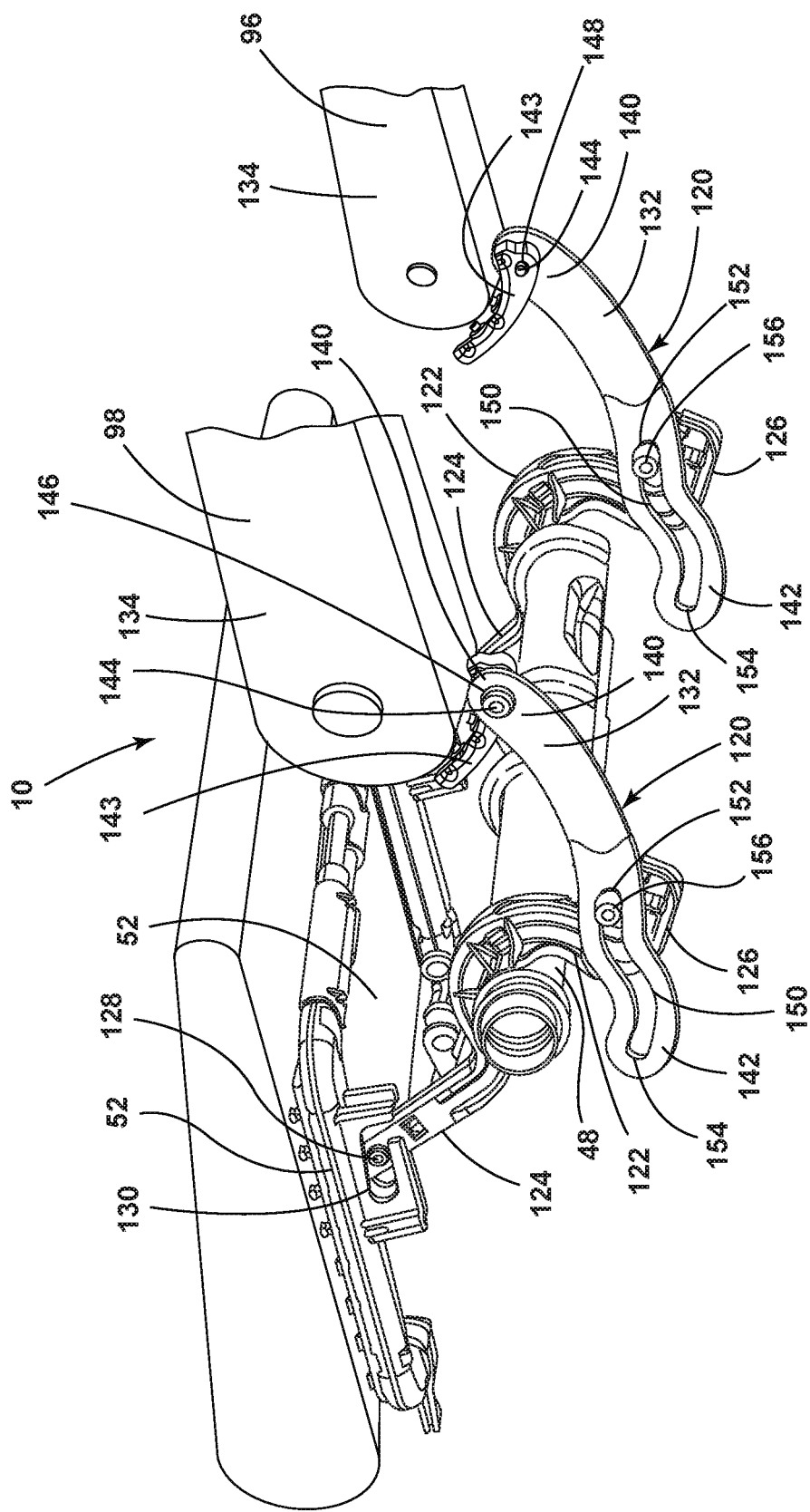
FIG. 6 is a bottom perspective view of the hip lifter mechanism of the automotive seating assembly of FIG. 1, wherein the seatback is in the fully reclined position.
Figure 6A:
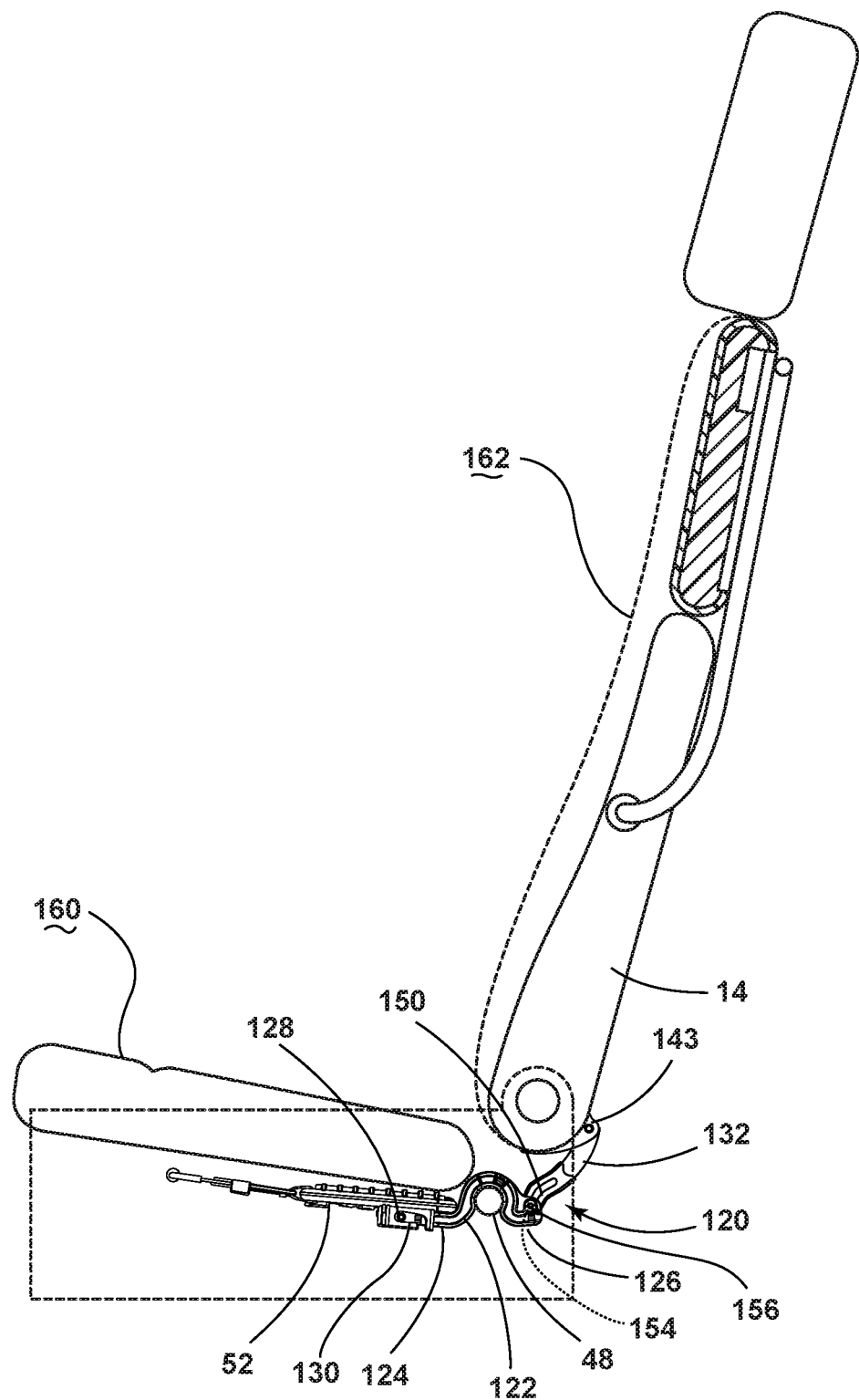
FIG. 6A is a side schematic view of the hip lifter mechanism of the automotive seating assembly of FIG. 1, wherein the seatback is in the upright position.
Figure 6B:
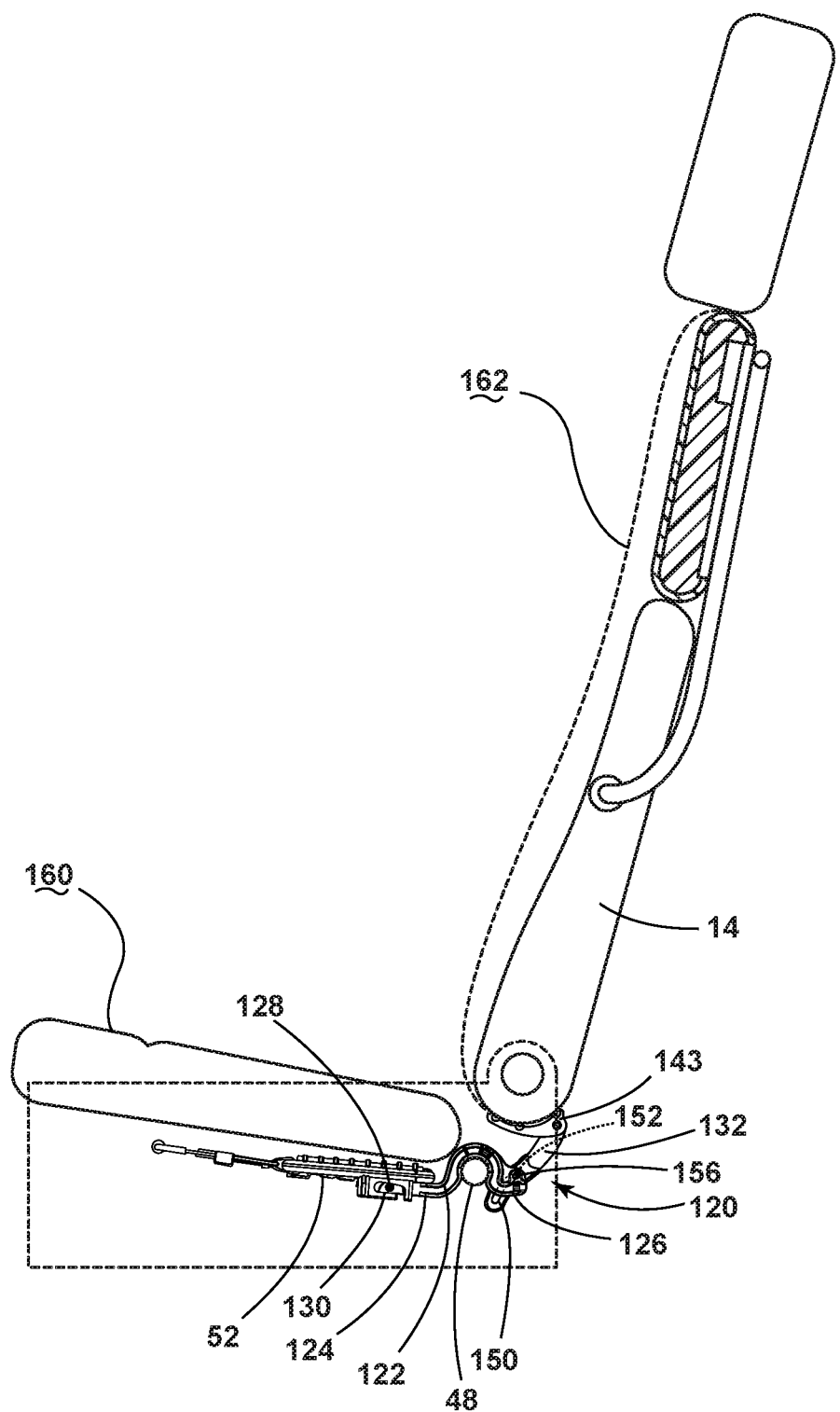
FIG. 6B is a side schematic view of the hip lifter mechanism of the automotive seating assembly of FIG. 1, wherein the seatback is in the first predetermined position.
Figure 6C:
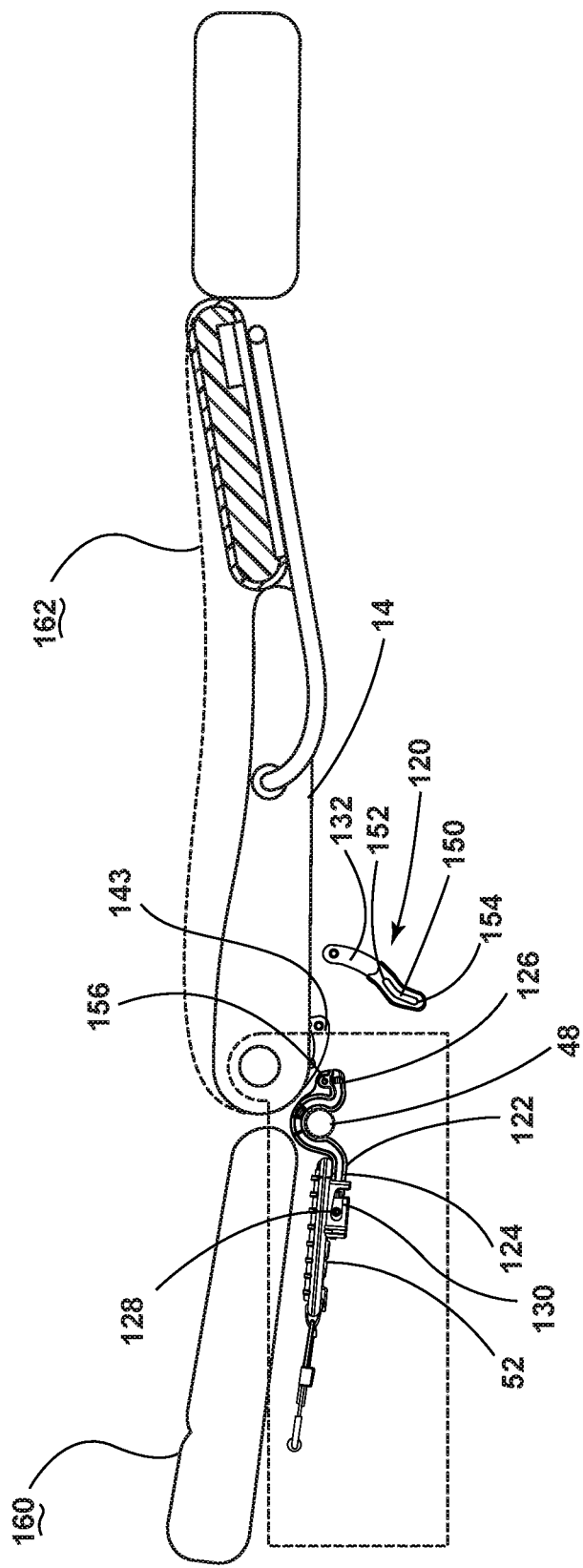
FIG. 6C is a side schematic view of the hip lifter mechanism with the link removed of the automotive seating assembly of FIG. 1, wherein the seatback is in the fully reclined position.
Figure 6D:
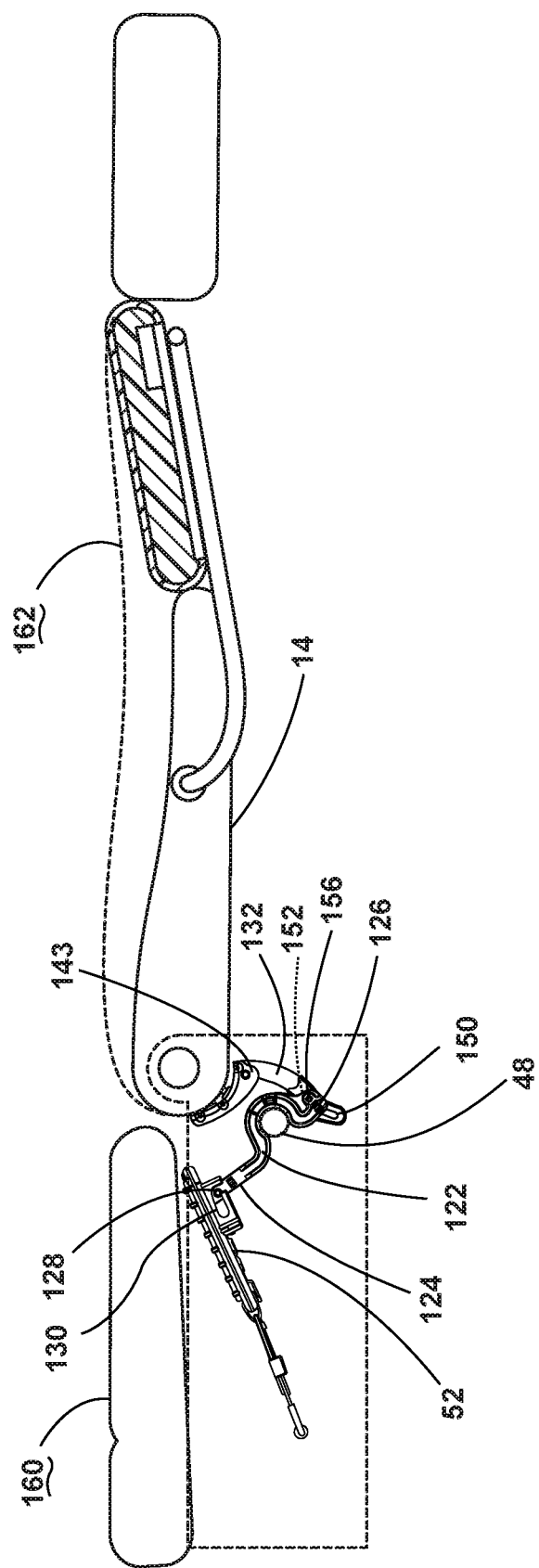
FIG. 6D is a schematic side view of the hip lifter mechanism with the link installed of the automotive seating assembly of FIG. 1, wherein the seatback is in the fully reclined position.

With reference to FIG. 5, the motor vehicle seating assembly 10 further includes a hip lifter mechanism 120, which comprises a pair of hip lifter pivot brackets 122 (also referred to as pivot brackets 122 or brackets 122) operably coupled with and pivotally disposed relative to the pivot bar 48. Each of the hip lifter pivot brackets 122 is preferably formed in a collar-shape that fits over and is supported by the pivot bar 48. Each of the pair of hip lifter pivot brackets 122 is preferably disposed proximate one of the pair of opposed lateral lower seat frame members 36, 38. As shown in FIGS. 6-6D and 7, each of the hip lifter pivot brackets 122 comprises a forward lever 124 and a rearward portion 126. The forward lever 124 of each of the pair of hip lifter pivot brackets 122 is likewise preferably laterally disposed between the pair of opposed lateral lower seat frame members 36, 38 and beneath one of the pair of lateral opposed lateral seatback frame members 96, 98 in the upright position. So disposed, the forward lever 124 of the hip lifter pivot brackets 122 includes a projection 128 that slidably engages a channel 130 of the secondary suspension 52, and, upon further rotation towards the fully reclined position, lifts the secondary suspension 52.

Referring again to FIGS. 6-6D, a pair of slotted linkages 132 is operably coupled with preferably the lower portions 134 of the opposed lateral seatback frame members 96, 98. Alternatively, the slotted linkages 132 may be attached to the lower transverse cross member 94 of the frame 90 of the seatback 14. In various aspects, slotted linkages 132 may be welded to the lower portions 134 of the opposed lateral seatback frame members 96, 98 or to the lower transverse cross member 94 of the frame 90 of the seatback 14. A slotted linkage 132 is pivotally attached or pinned to an arm 143 at a first end 140 and pivotally attached or pinned to the rearward portion 126 of the hip lifter pivot brackets 122 at a second end 142. The pivotable attachment of the first end 140 of the slotted linkage 132 to the arm 143 of the seatback 14 is preferably accomplished by a connector 144 secured within an opening 146, 148 in each of the first end 140 of the slotted linkage 132 and the arm 143, respectively, allowing relative pivotal motion. As shown in FIGS. 6-6D, the slotted linkage 132 is provided with a slot 150 proximate the second end 142 of the slotted linkage 132 that is operably coupled with the rearward portion 126 of the hip lifter pivot bracket 122. The slot 150 of the slotted linkage 132 has an upper end 152 and a lower end 154. The rearward portion 126 of the hip lifter pivot bracket 122 is coupled to a pin 156 that is received within the slot 150. In various aspects, the slotted linkages 132 may be links or linkages of various shapes, sizes, and designs.

In operation, each of the forward levers 124 includes a projection 128 that moves within the channels 130 of the secondary suspension 52. That is, when the seatback 14 is in the upright position, the lower end 154 of the slot 150 is proximate the pin 156 provided in the rearward portion 126, as shown in FIG. 6A. Thus, when the lower end 154 of the slot 150 is proximate with the pin 156, the seatback 14 position corresponds to the upright position of the seatback 14. Similarly, as the seatback 14 is reclined, the upper end 152 of the slot 150 is brought into initial contact with the pin 156 provided in the rearward portion 126, where the seatback 14 position corresponds to a predetermined reclined position between the upright position and the fully reclined position, as shown in FIG. 6B. Preferably, the predetermined reclined position of the seatback 14 is about 55.5° relative to a vertical plane. Further rotation of seatback 14 toward the fully reclined position further displaces the rearward portion 126 of the hip lifter pivot bracket 122 downward, which, in turn, rotates the hip lifter pivot bracket 122 and raises the forward lever 124, which then urges the projection 128 backward within the channel 130 of the secondary suspension 52. This action raises the secondary suspension 52 upwardly upon the seatback pivoting beyond the predetermined reclined position in FIG. 6B between the upright position in FIG. 6A and the fully reclined position in FIG. 6D.

As best shown in FIGS. 3A, 3B and 4, each of the lower seating structure 12 and the seatback 14 have an exposed surface 160, 162, respectively. Preferably, the exposed surface 160 comprises a locally flexible/stretch trim material relative to the cushion assembly 164 that may be moved in order to keep the trim material and foam of the cushion assembly 164 in tension to maintain a flat surface and eliminate wrinkling. In particular, a rear edge 166 of the cushion assembly 164 of the lower seating structure 12 is raised by moving the seatback 14 to the fully reclined position, such that the secondary suspension 52 raises the exposed surface 160 of the seat cushion assembly 164 to substantially occupy the same horizontal plane as that of the exposed surface 162 of the seatback 14 when the seatback 14 is in a fully reclined position. This benefit might be most appreciated by comparing the relative exposed surfaces 160, 162 in FIG. 6C, where the slotted linkage 132 has been removed and the hip lifter mechanism 120 thus disabled, with the relative exposed surfaces 160, 162 shown in FIG. 6D, where the slotted linkage 132 is installed and the exposed surfaces 160, 162 occupy substantially the same plane.

Referring to FIG. 9, preferably, the hip lifter mechanism 120 raises the secondary suspension 52 and cushion assembly 164 a distance H between 45 to 70 mm between the upright position and the fully reclined position of the seatback 14 to eliminate pressure on the lumbar and lifting the occupant's tailbone and hips, as shown in FIG. 9. The result is a substantially planar and continuous surface from the exposed surfaces 160, 162 of the cushion assembly 164 and seatback 14, respectively. With reference to FIG. 4, preferably, the fully reclined position of the seatback 14 is reached at about 85° from vertical. The fully reclined position of the seating assembly 10 extends from front edge 168 of the lower seating structure 12 to an upper portion 170 of the seatback 14. The upper portion 170 of the seatback 14 is adjustable relative to the back of the seatback 14.

In addition, the slotted linkage 132 for the hip lifter mechanism 120 provides a passive system that automatically raises the height of the lower seating structure cushion assembly 164 once the seatback 14 reaches a desired sleeper initiation angle, here preferably 55.5° from vertical, and achieves maximum lift of the cushion assembly 164 once the seatback 14 reaches the maximum sleeper angle, here preferably 85° from vertical. Additional benefits of the hip lifter mechanism 120 disclosed herein is that the forward levers 124 are coupled to the secondary suspension 52 and disposed between the opposed lateral lower seat frame members 36, 38 so as not to affect the seating assembly H-point or comfort when the seatback 14 of the seating assembly 10 is not in the fully reclined position or sleeper mode. Further, the maximum lift height of the rear edge 166 of the cushion assembly 164 of the lower seating structure 12 can be readily modified and tuned to specific applications by relatively simple changes to the system geometry, such as the shape and length of the slot 150.

Further, the hip lifter mechanism 120 represents a relatively simple mechanical system which can be manually actuated and does not require a motor, although a power actuated vehicle seating assembly can likewise beneficially employ the disclosed hip lifter mechanism 120. In addition, existing seatback 14, recline latch controls 172 and associated mechanisms can be readily employed to maintain the seatback 14 in the desired reclined position between the upright position and the fully reclined position, while simultaneously providing the lift function for the rear edge 166 of the lower seating structure cushion assembly 164 beyond a predetermined reclined position. Finally, the disposed hip lifter mechanism 120 is readily adaptable as a retrofit device to existing motor vehicle seating assemblies 10.

Thus, to the extent that a motor vehicle occupant desires a supine position to rest when the motor vehicle 6 is not in operation, the aforementioned disclosure provides just such a platform upon which the motor vehicle occupant may rest. In accordance with the aforementioned disclosure, it is now possible to provide a more comfortable sleeping seat surface by raising the height of the rear edge 166 of the cushion assembly 164 of the lower seating structure 12 to make the overall surface more level and the transition from the cushion assembly 164 to the seatback 14 less noticeable.

Figure 10:
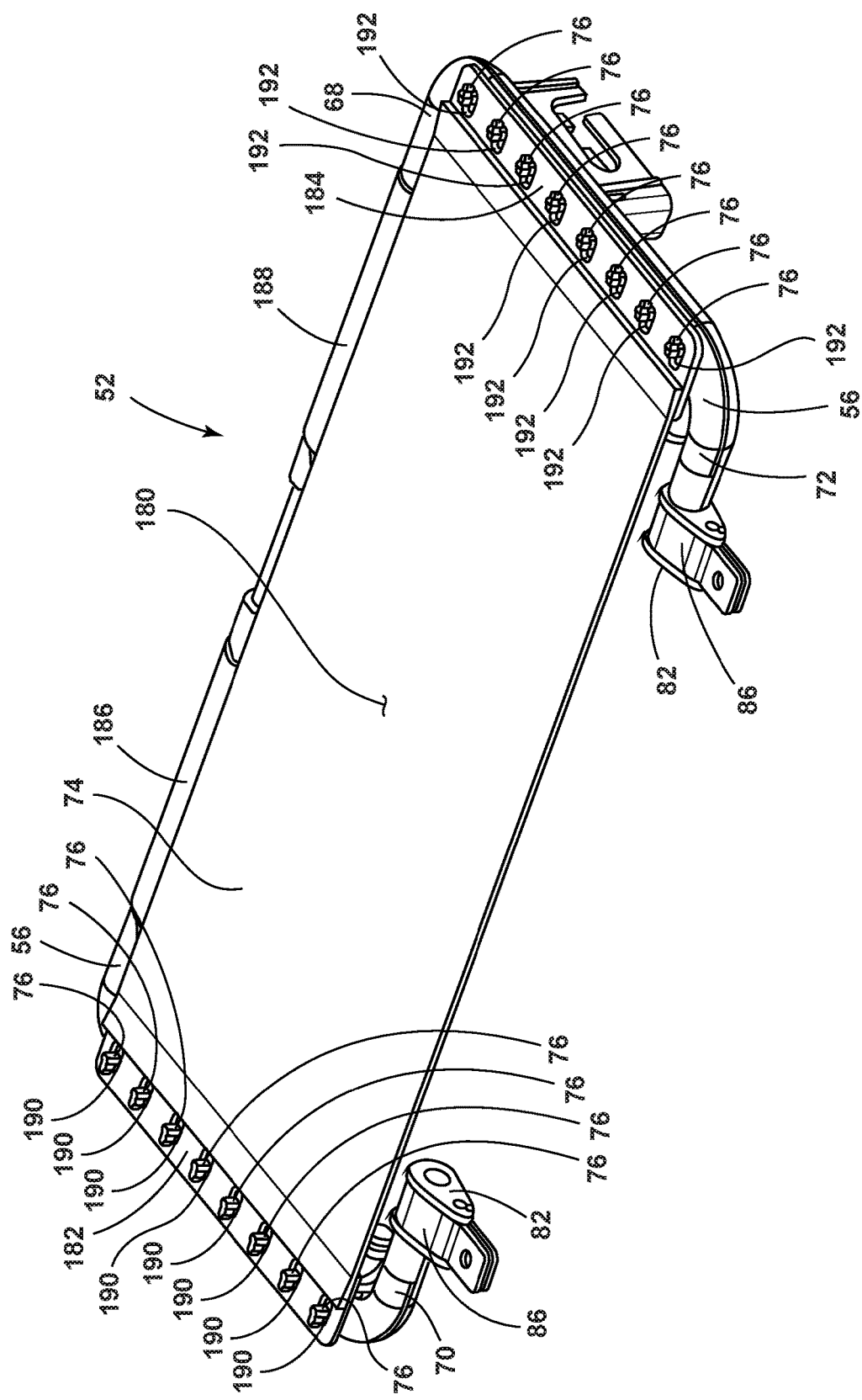
FIG. 10 is a top perspective view of the secondary suspension of the seating assembly.
Figure 11:
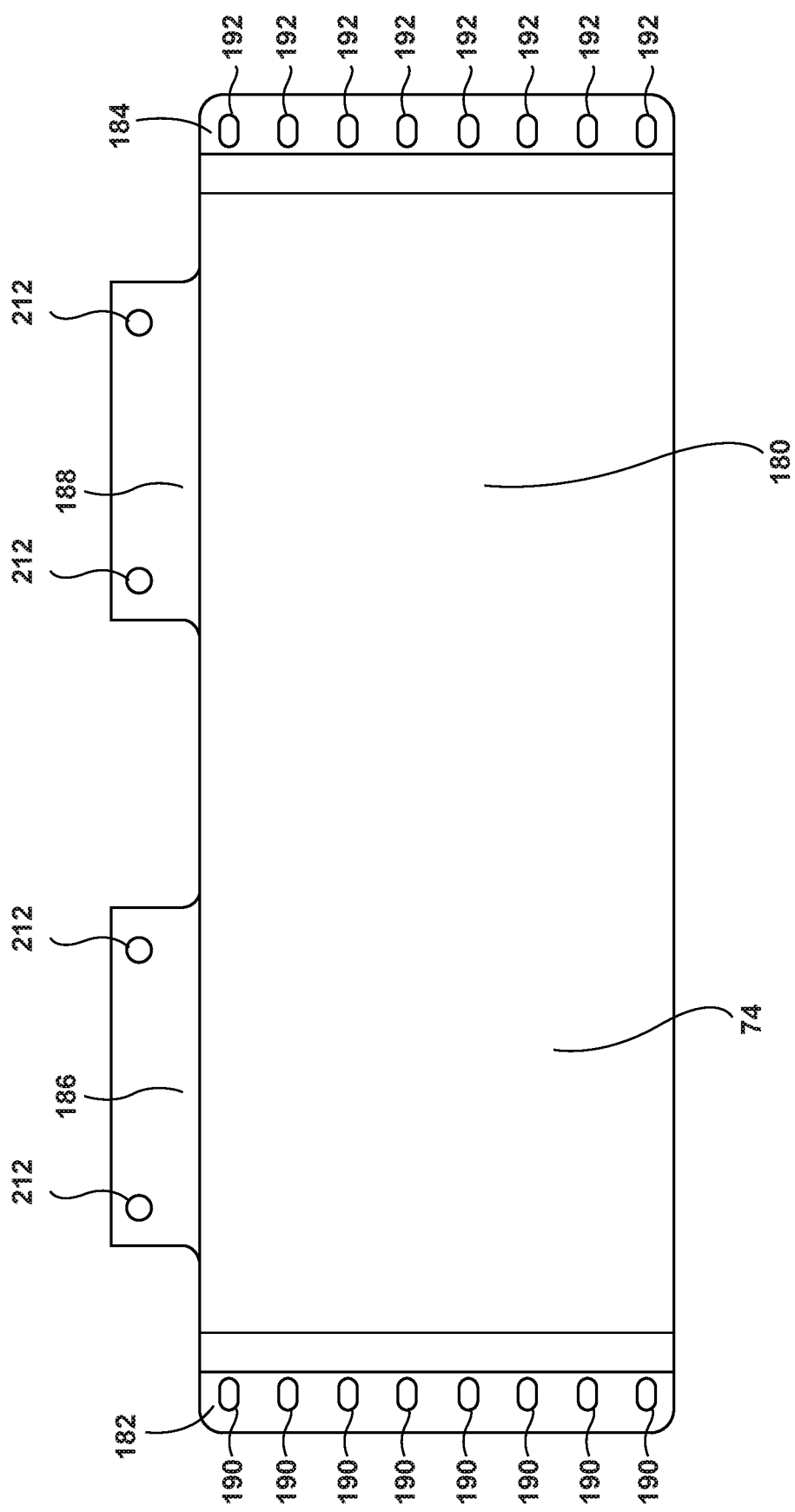
FIG. 11 is a top plan view of the mat of the secondary suspension.

With reference to FIGS. 10-11, the secondary suspension 52 includes the frame 56 and the mat 74. The mat 74 includes a generally rectangular center portion 180. The generally rectangular center portion 180 has attachment features 182, 184 at opposing ends of the generally rectangular center portion 180. Two additional attachment features 186, 188 are at the cross member 68 of the frame 56. The attachment feature 182 includes holes 190 for receiving nubs 76. Similarly, the attachment feature 184 includes holes 192 for receiving nubs 76. The attachment feature 186 includes holes 212 for receiving nubs 210. The attachment feature 188 includes holes 212 for receiving nubs 210. In various aspects, the mat 74 is made of a load-bearing, flexible, creep-resistant, strong material. One such suitable load bearing material is a DYMETROL material available from ACME Mills. Inwardly extending members 70, 72 of frame 56 include clips 82. Clamps 86 cover clips 82.

Figure 12:
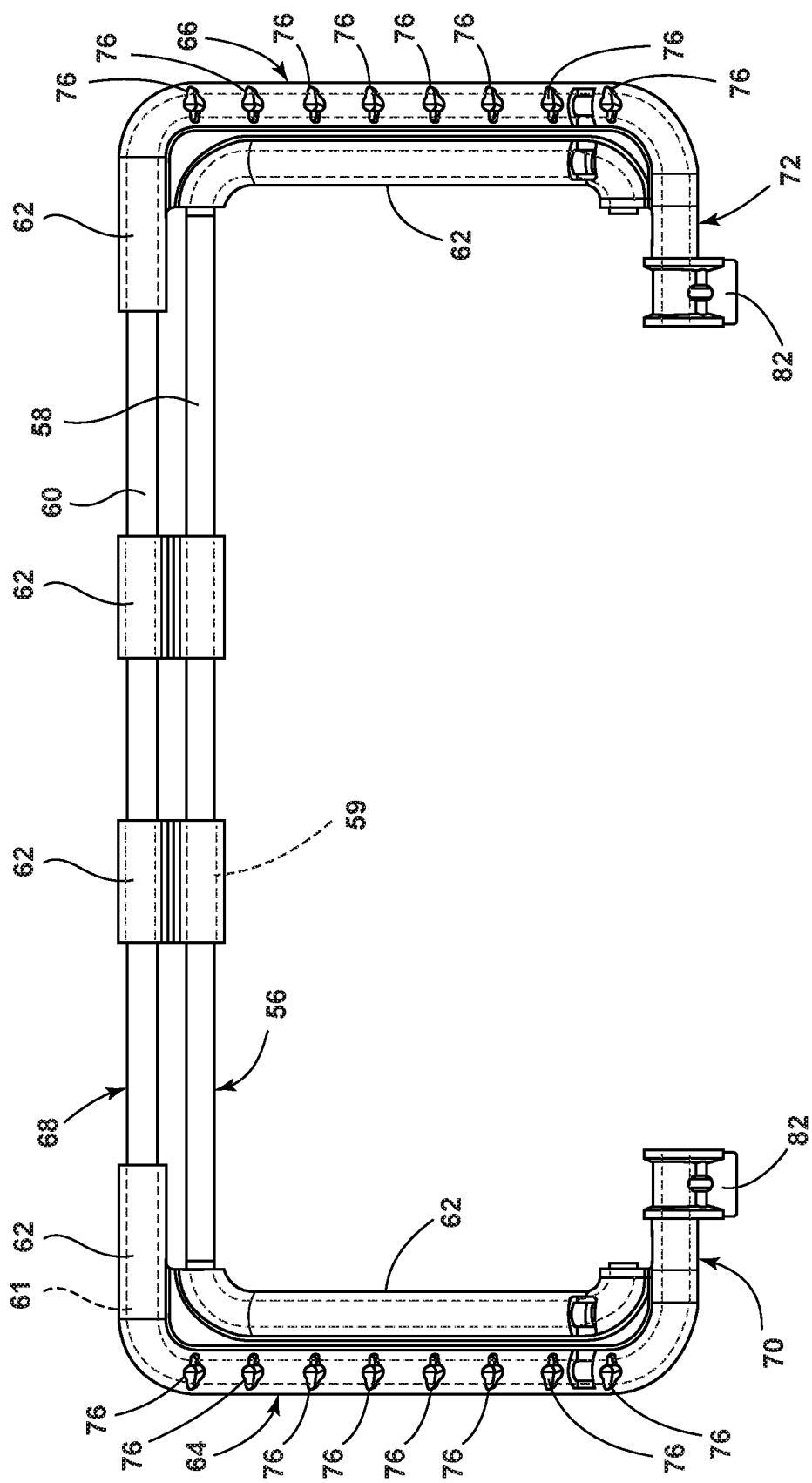
FIG. 12 is a top plan view of the frame of the secondary suspension.

FIG. 12 is a top plan view of the frame 56. The frame 56 includes an inner C-shaped member 58 and an outer C-shaped member 60. During production of the frame 56, an inner C-shaped wire 59 and an outer C-shaped wire 61 are used. Inner C-shaped wire 59 and outer C-shaped wire 61 have a diameter of approximately 0.8 mm that is over molded with glass-filled nylon portions 62. Attachment clips 82 and nubs 76 are designed into the mold. In various aspects, the frame 56 is removed from the mold as depicted in FIG. 12. With reference to FIGS. 11-12, in various aspects, nubs 76 are hook-shaped for receiving the holes 190, 192 of the attachment feature 182 and the attachment feature 184, respectively, of the mat 74. The frame 56 includes a pair of lateral opposed frame members 64, 66 and a cross member 68 extending between the pair of lateral opposed frame members 64, 66. Inwardly extending members 70, 72 extend from lateral opposed frame members 64, 66.

Figure 13:
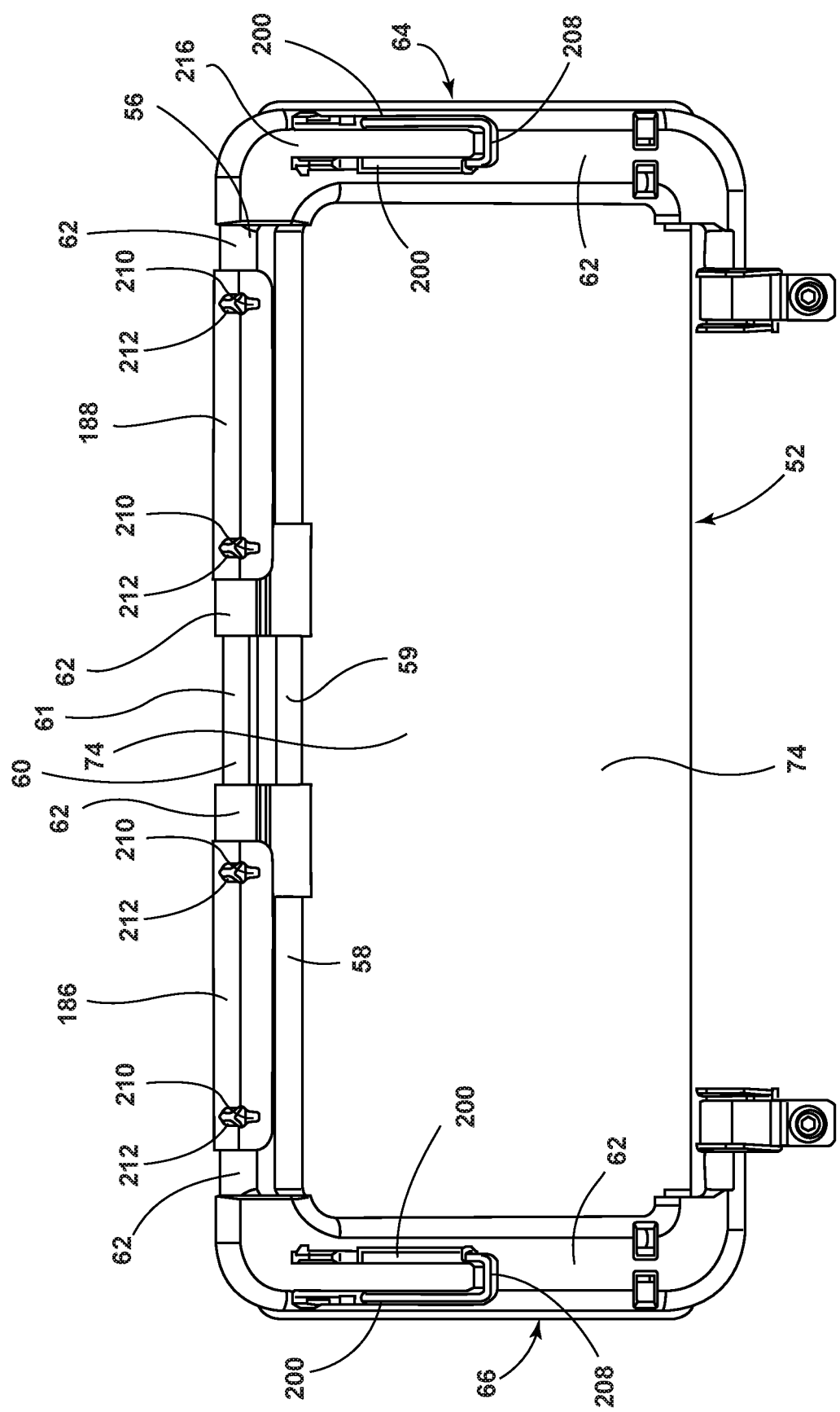
FIG. 13 is a bottom perspective view of the secondary suspension.

Referring to FIG. 13, the secondary suspension 52 is visible from the bottom. Flanges 200 protrude from the bottoms of the lateral opposed frame members 64 and 66. In various aspects, flanges 200 are part of a bent U-shaped member 208. In the depicted aspect, four molded nubs 210 are located on the underside of the outer C-shaped member 60 glass-filled nylon portion 62 of the frame 56. The mat 74 attachment features 186 and 188 include holes 212 for receiving nubs 210. Nubs 210 are generally hook-shaped. The frame 56 includes inner C-shaped wire 59, outer C-shaped wire 61, and glass-filled nylon portions 62. In various aspects, the frame 56 may be described as having a rectangular shape.

Figure 14:
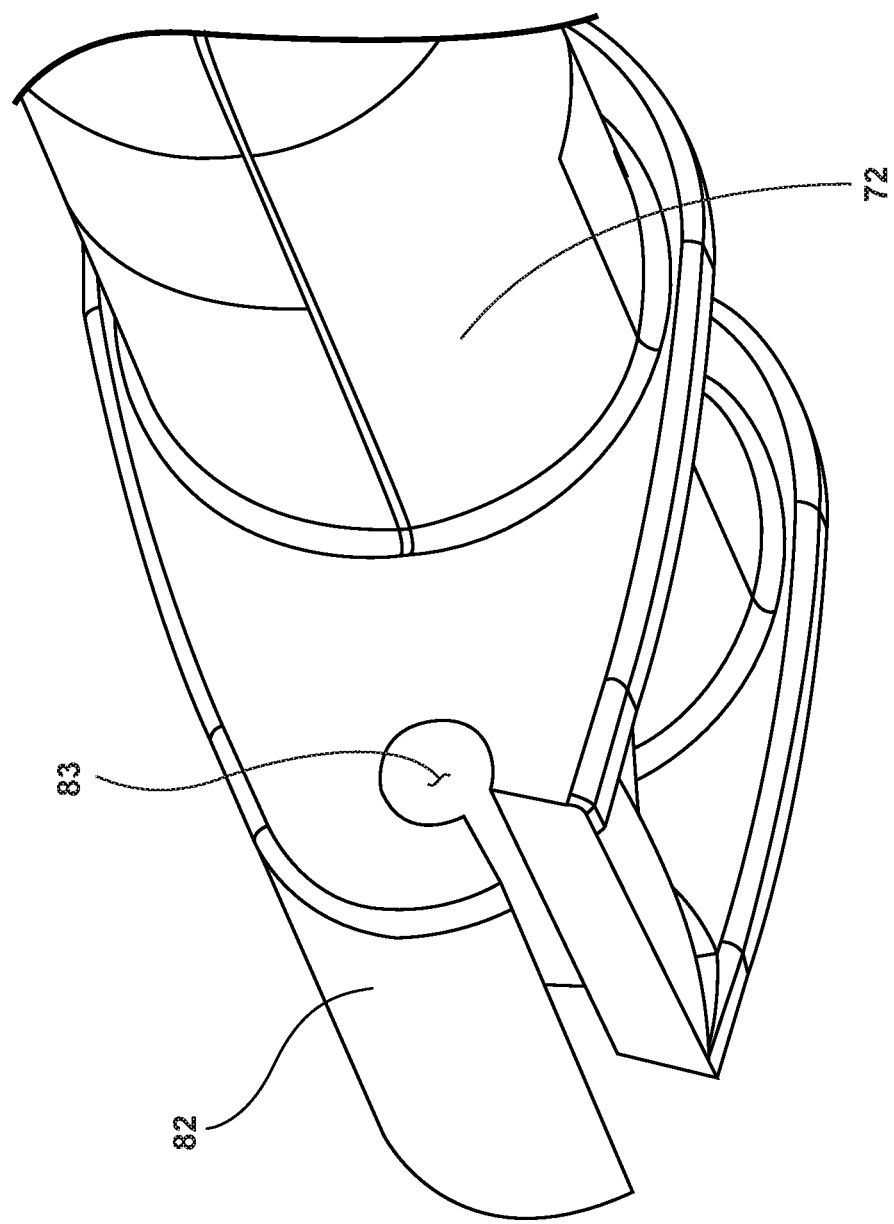
FIG. 14 is a side perspective view of an attachment clip of the secondary suspension.
Figure 16:
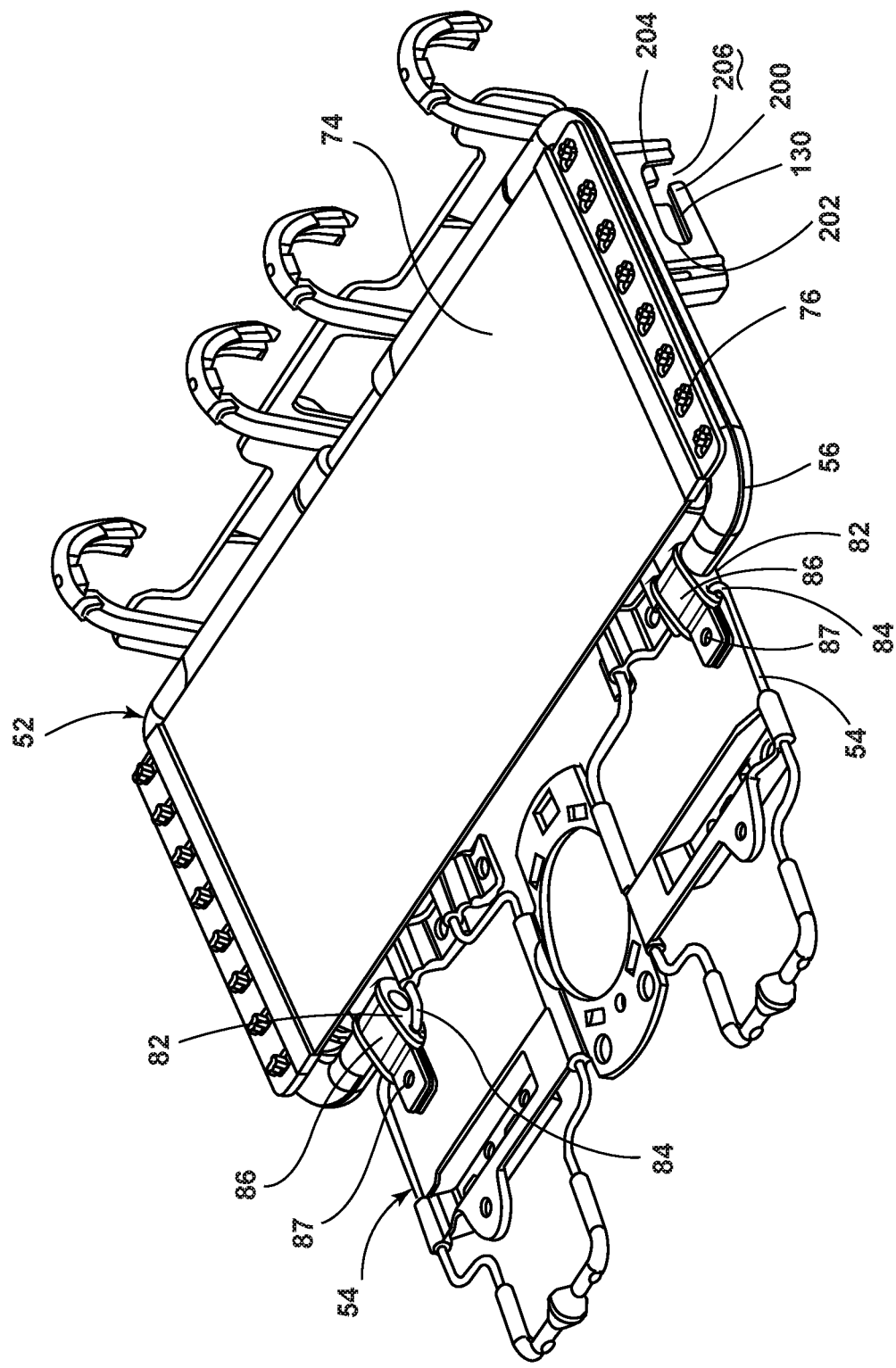
FIG. 16 is a top perspective view of the secondary suspension coupled with the primary suspension.

Referring to FIGS. 14 and 16, the clip 82 protrudes from the inwardly extending member 72. In various aspects of the disclosure, the clip 82 may be another type of fastener for securing a suspension (secondary suspension 52 in the depicted aspect) to a lower seating structure 12. A circular opening 83 in the clip 82 receives a circular member of the primary suspension 54. In the depicted aspect, the circular member wire 84. The clip 82 is pivotally coupled about the wire 84.

Figure 15:
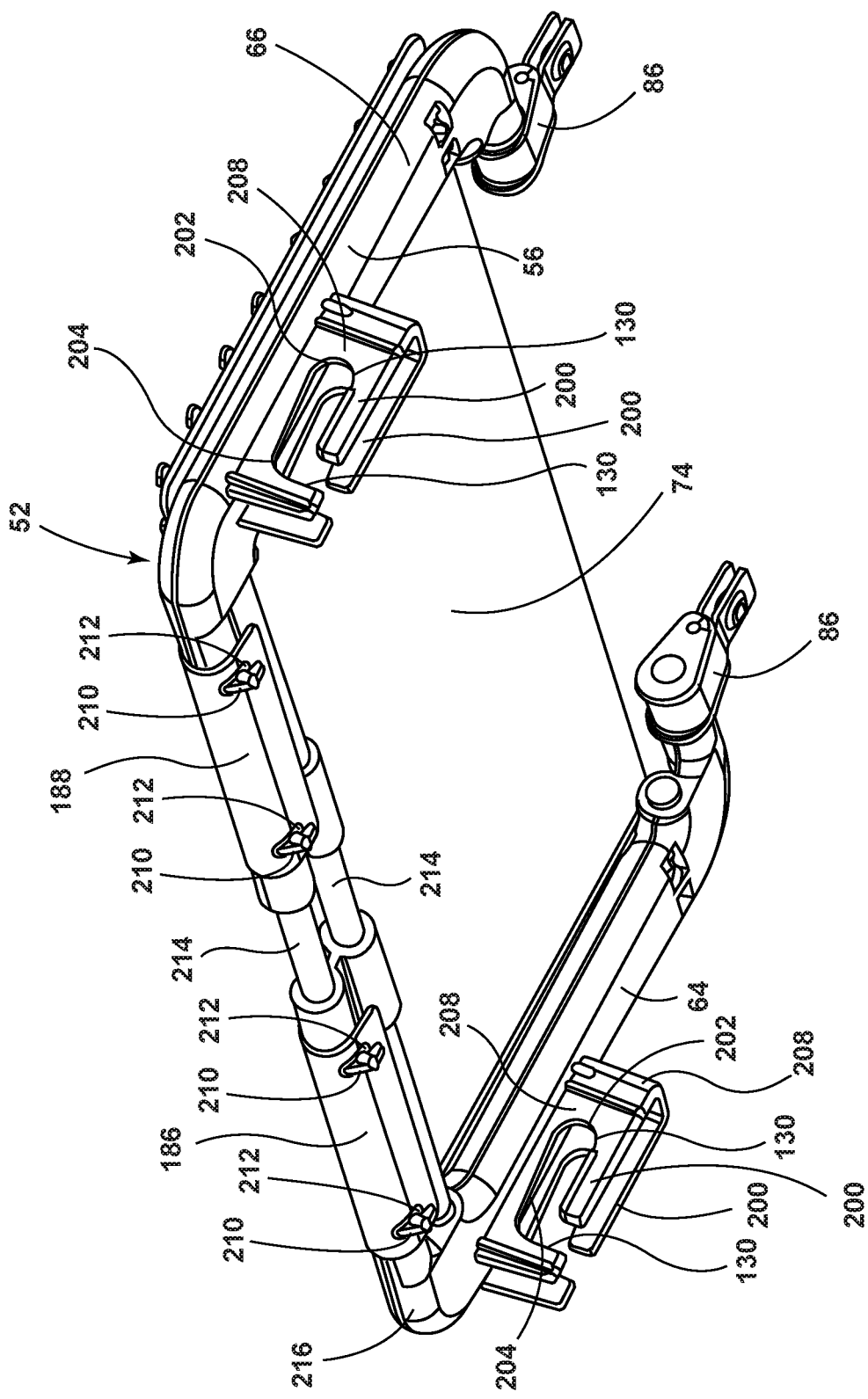
FIG. 15 is a bottom plan view of the secondary suspension.

Referring to FIG. 15, a bottom perspective view of the secondary suspension 52 is shown. The mat 74 is attached to the frame 56. Flanges 200 extend from the frame 56 lateral opposed frame members 64, 66. Flanges 200 each include a channel 130. When the secondary suspension 52 is placed in a seating assembly 10 in a vehicle 6 in the forward-facing direction, the channels 130 have a forward portion 202 and a rearward portion 204.

Referring to FIG. 16, the secondary suspension 52 is shown attached to the primary suspension 54 with the clips 82. Clamps 86 secure the clips 82 to the wires 84 of the primary suspension 54. A pair of channels 130 are located on a pair of flanges 200 that extend from the bottom of the secondary suspension 52 frame 56. Each channel 130 includes a forward portion 202 and a rearward portion 204. An opening 206 is proximate the channel 130. In various aspects, the secondary suspension 52 and the primary suspension 54 could be molded as an integral part in one tool. The clamp 86 secures the secondary suspension 52 to the primary suspension 54 (secondary suspension 52 in the depicted aspect).

Figure 17:
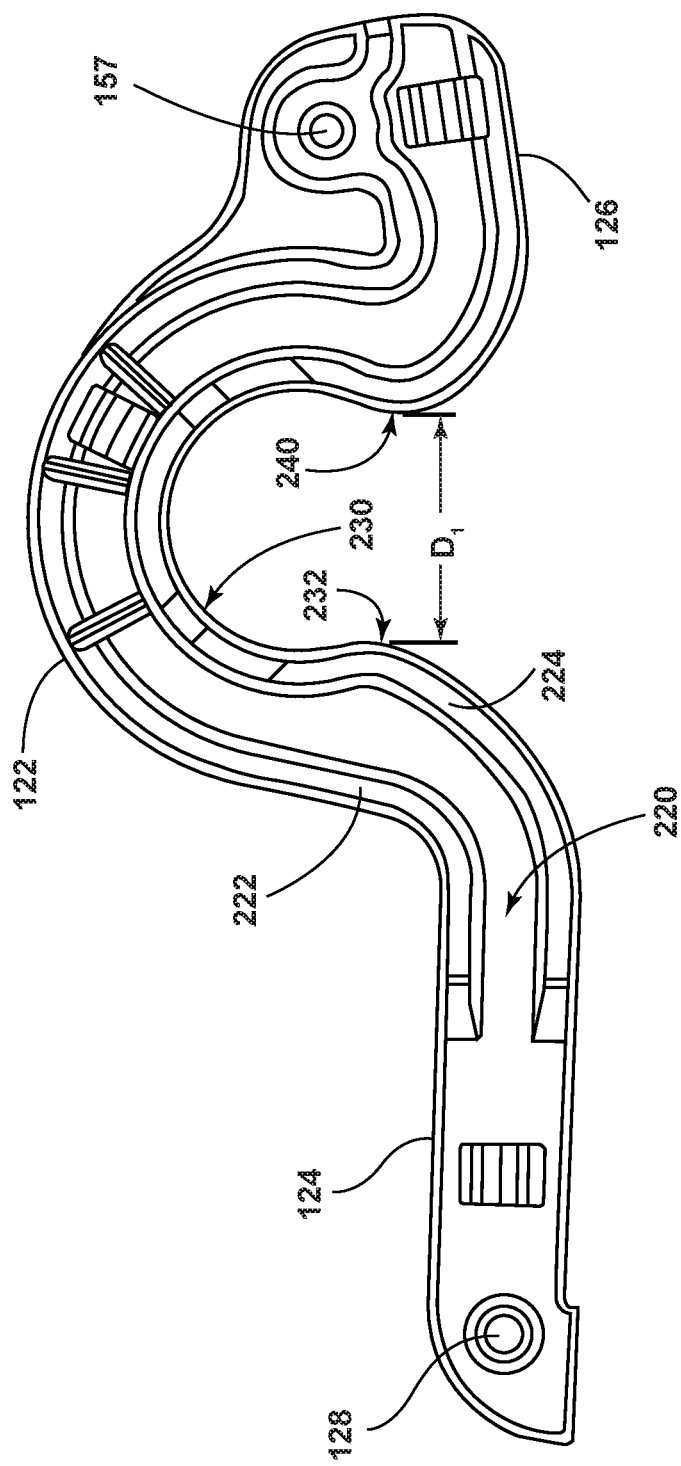
FIG. 17 is a first side view of the pivot bracket.

With reference to FIGS. 17-30, pivot bracket 122 is shown. Referring to FIG. 17, pivot bracket 122 includes a forward lever 124 and a rearward portion 126. Referring to FIGS. 6 and 17, forward lever 124 includes a projection 128 for engagement with the channels 130 of the secondary suspension 52. Rearward portion 126 includes a hole 157 for receiving a pin 156 that attaches the rearward portion 126 to the slot 150 in the slotted linkage 132. In various aspects of the disclosure, forward lever 124 may be a cantilevered beam. The bracket 122 includes an I-beam structure 220 that strengthens the bracket 122. The I-beam structure 220 includes an upper flange 222 and a lower flange 224. The pivot bracket 122 includes a collar portion 230. The collar portion 230 is bounded by retention members 232 on the forward lever 124 side of the bracket 122 and retention members 240 on the rearward portion 126 side of the bracket 122. In the depicted aspect, retention members 232 and 240 generally oppose one another.

Figure 18:
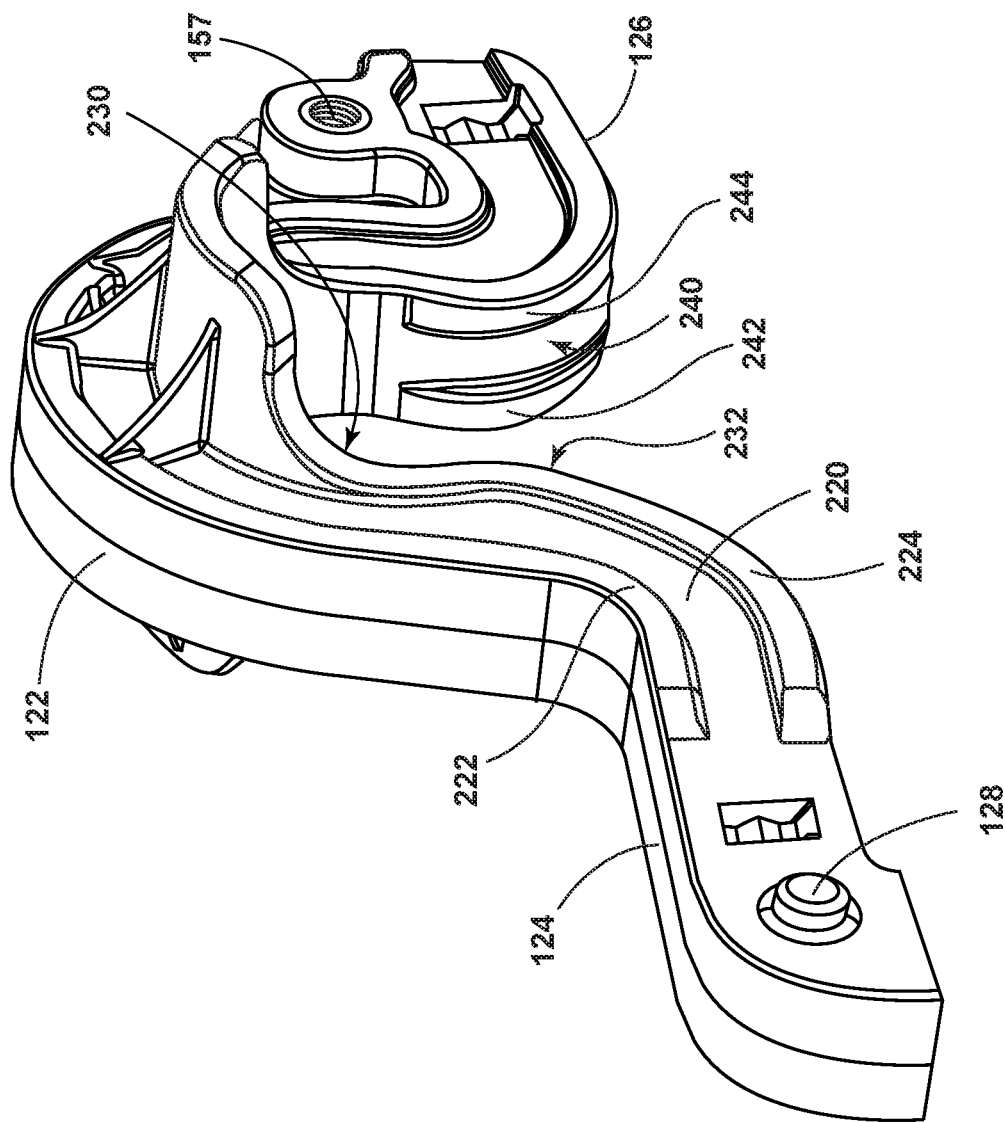
FIG. 18 is a perspective view of the retention features proximate the rearward portion of the pivot bracket.

Referring to FIG. 18, retention member 240 includes a first protrusion 242 and a second protrusion 244 that are located proximate the rearward portion 126 of the bracket 122.

Figure 19:
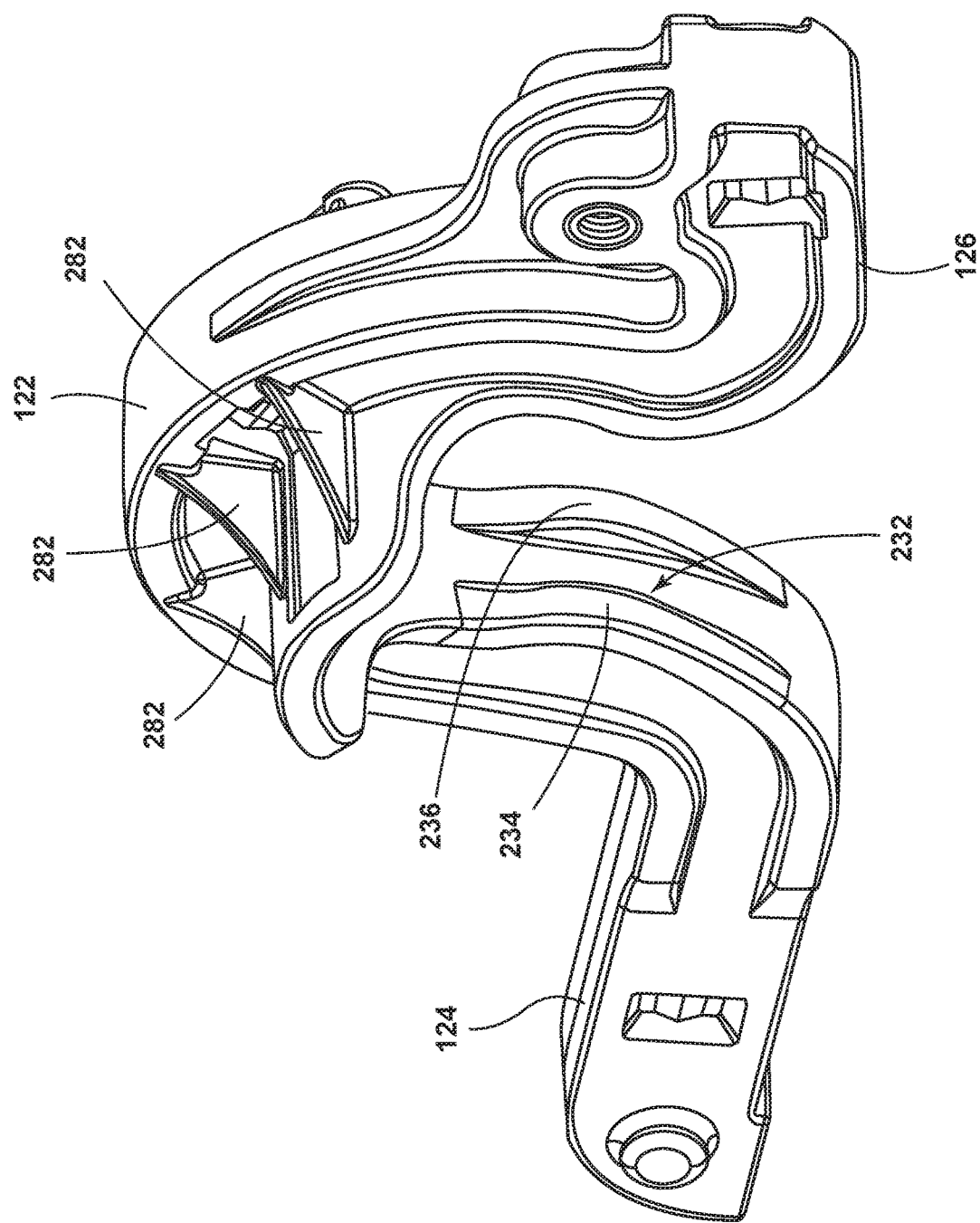
FIG. 19 is a perspective view of the retention features proximate the forward lever of the pivot bracket.

Referring to FIG. 19, retention member 232 includes a first protrusion 234 and a second protrusion 236 that are located proximate the forward lever 124 of the bracket 122.

With reference to FIGS. 17-19, a distance $D_1$ is between the retention member 232 and the retention member 240. The distance $D_1$ refers to the distance between opposing first protrusion 242 of retention member 240 and second protrusion 236 of retention member 232 and opposing second protrusion 244 of retention member 240 and first protrusion 234 of retention member 232.

Figure 20:
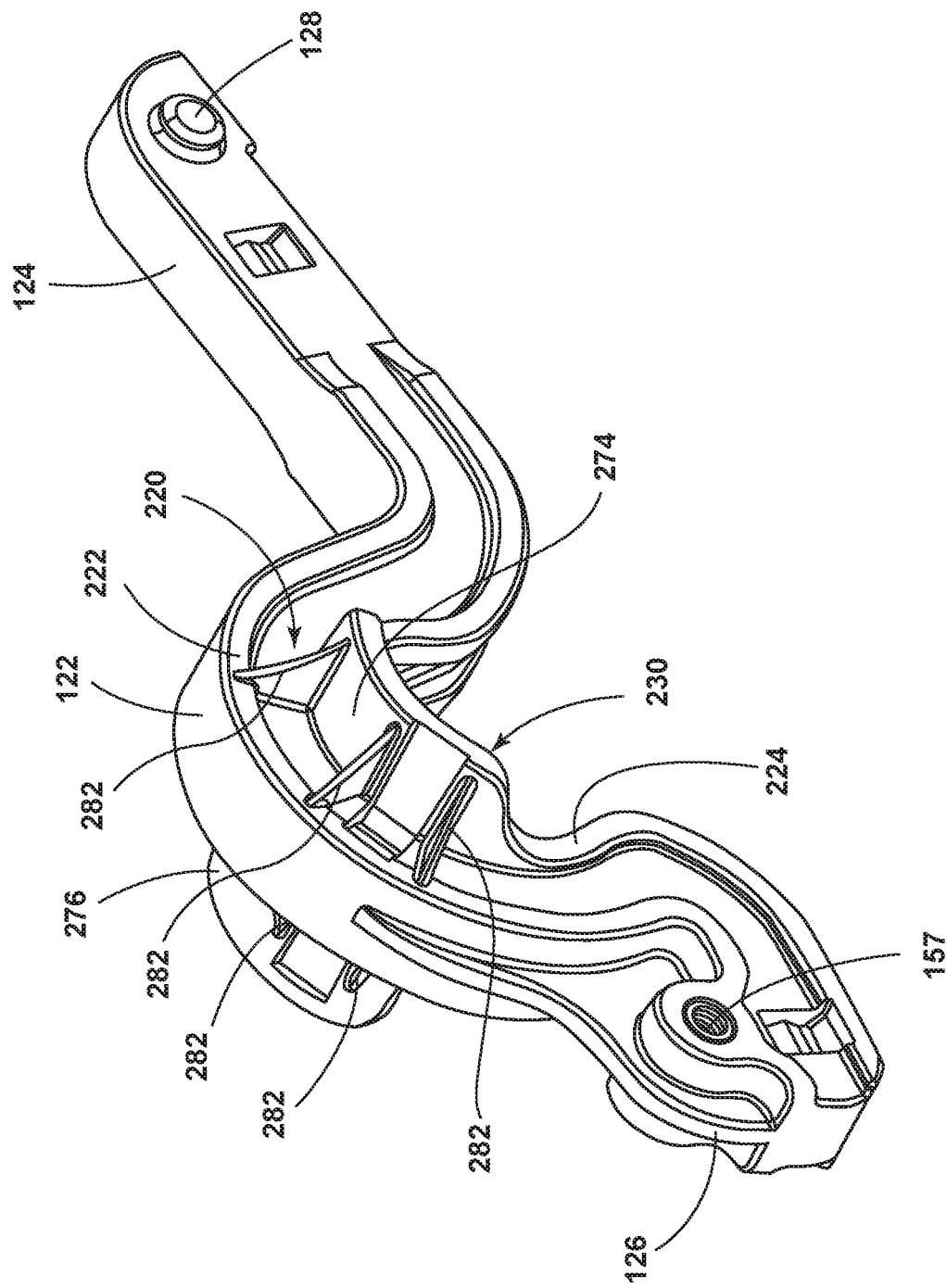
FIG. 20 is a first perspective view of a flange of the bracket.
Figure 21:
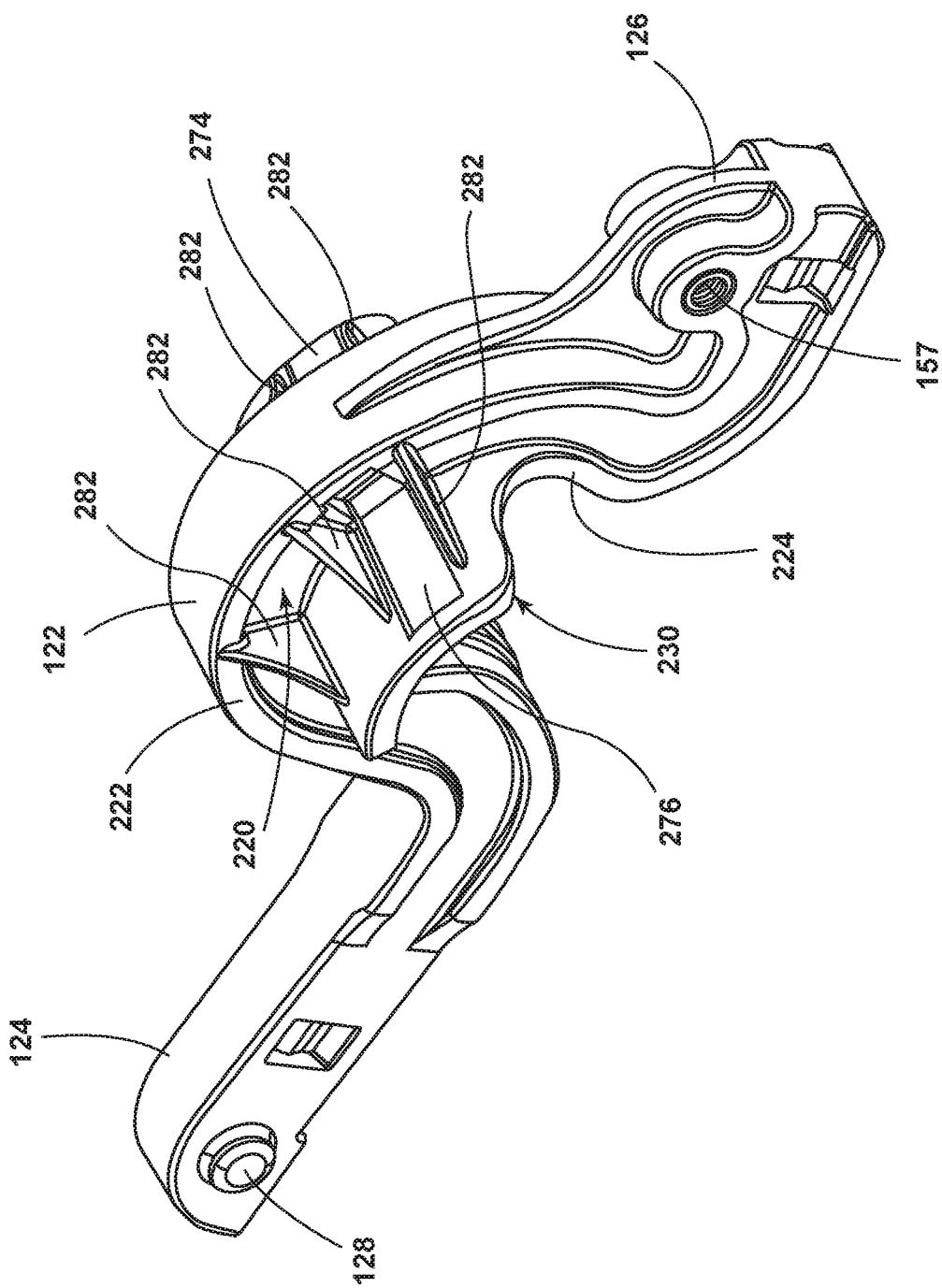
FIG. 21 is a second perspective view of a flange of the bracket.

Referring to FIGS. 20-21, bracket 122 is shown in a first perspective view and a second perspective view, respectively. Bracket 122 includes forward lever 124 and rearward portion 126. The bracket 122 is fabricated with an I-beam structure 220. The I-beam structure 220 includes upper flange 222 and lower flange 224. Lower flange 224 includes outward flanges 274, 276 that are part of the collar portion 230 of the bracket 122. Flanges 274, 276 stabilize the pivot bracket 122 when it is coupled to the pivot bar 48. Protrusion 128 is on the forward lever 124. With reference to FIGS. 6, 20 and 21, projection 128 is coupled to channels 130 of the secondary suspension 52. Hole 157 for receiving pin 156 to connect the bracket 122 to the slot 150 is located on the rearward portion 126 of the bracket 122.

Figure 22:
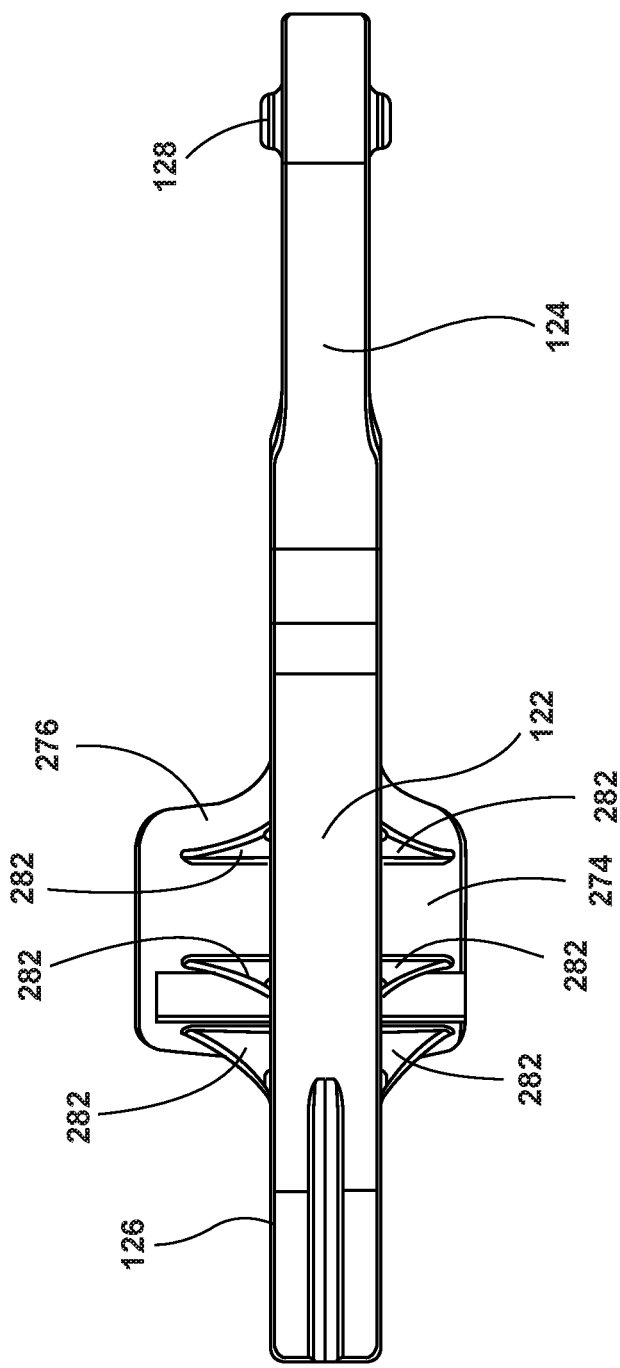
FIG. 22 is a top view of the bracket.
Figure 23:
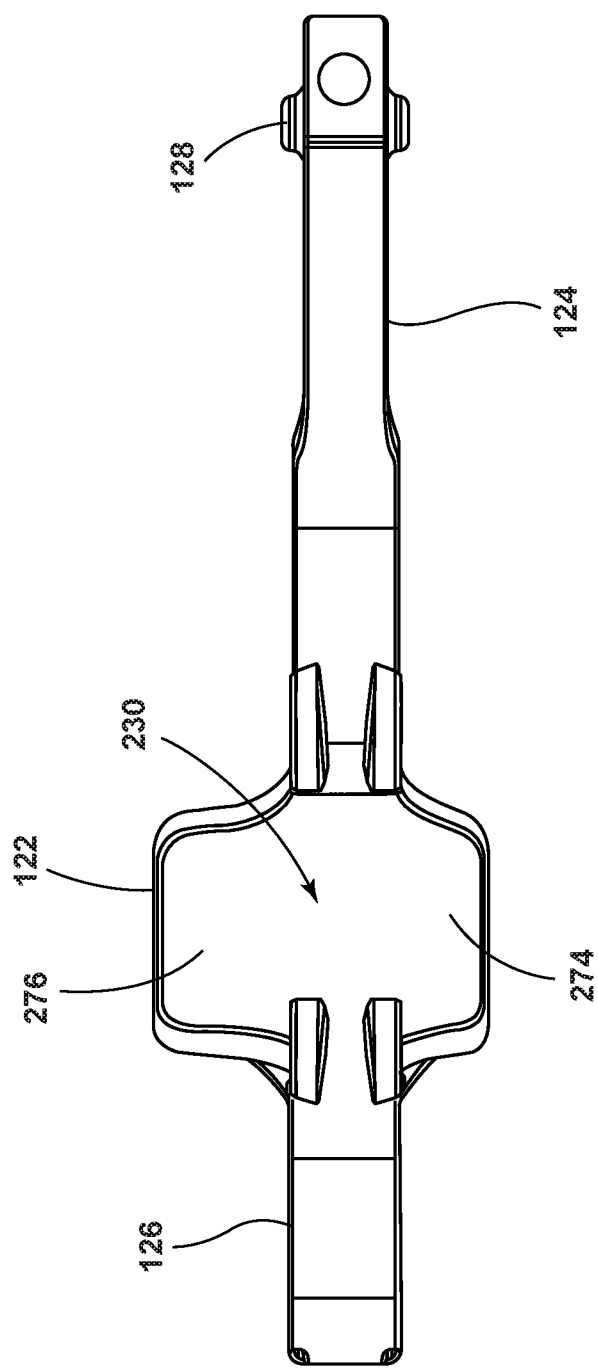
FIG. 23 is a bottom view of the bracket.

Referring to FIGS. 22-23, a top view of the bracket 122 and a bottom view of the bracket 122 are shown, respectively. The top view of the bracket 122 includes the forward lever 124 and the rearward portion 126. Flanges 274, 276 protrude from the bracket 122. Ribs 282 provide additional strength to the flanges 274, 276. With regard to FIG. 23, the collar portion 230 of the bracket 122 is shown inside the flanges 274, 276. Referring to FIGS. 22 and 23, the projection 128 and forward lever 124 are also shown.

Figure 25:
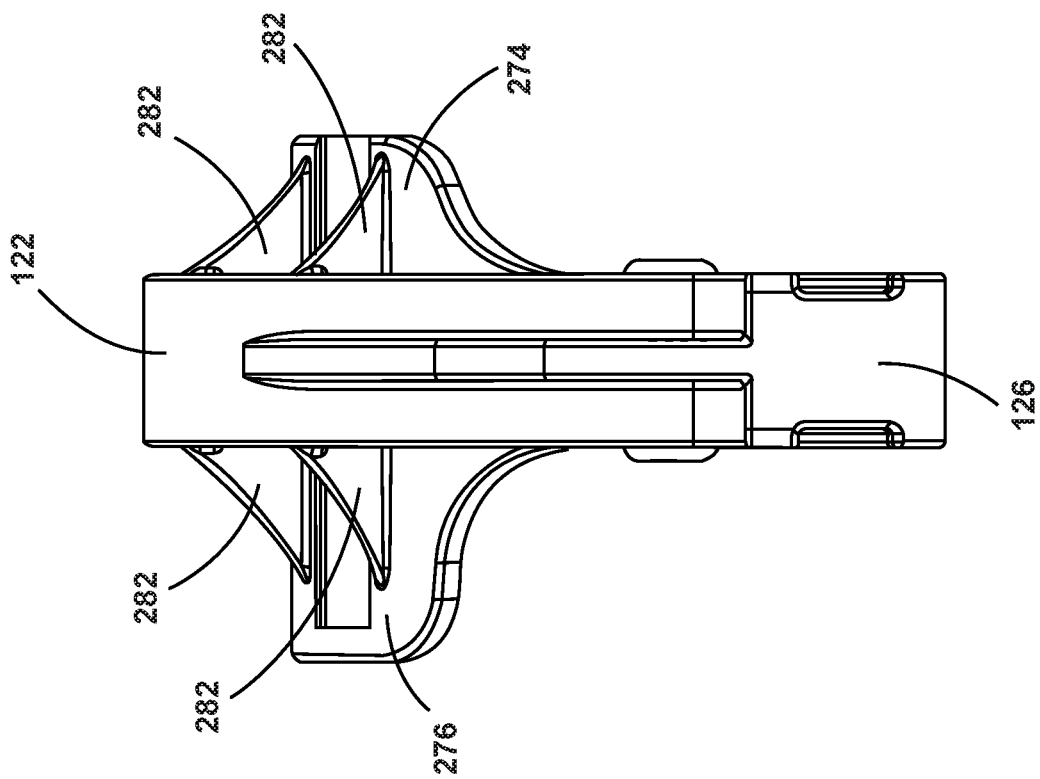
FIG. 25 is a back view of the bracket taken from the rearward portion end.
Figure 24:
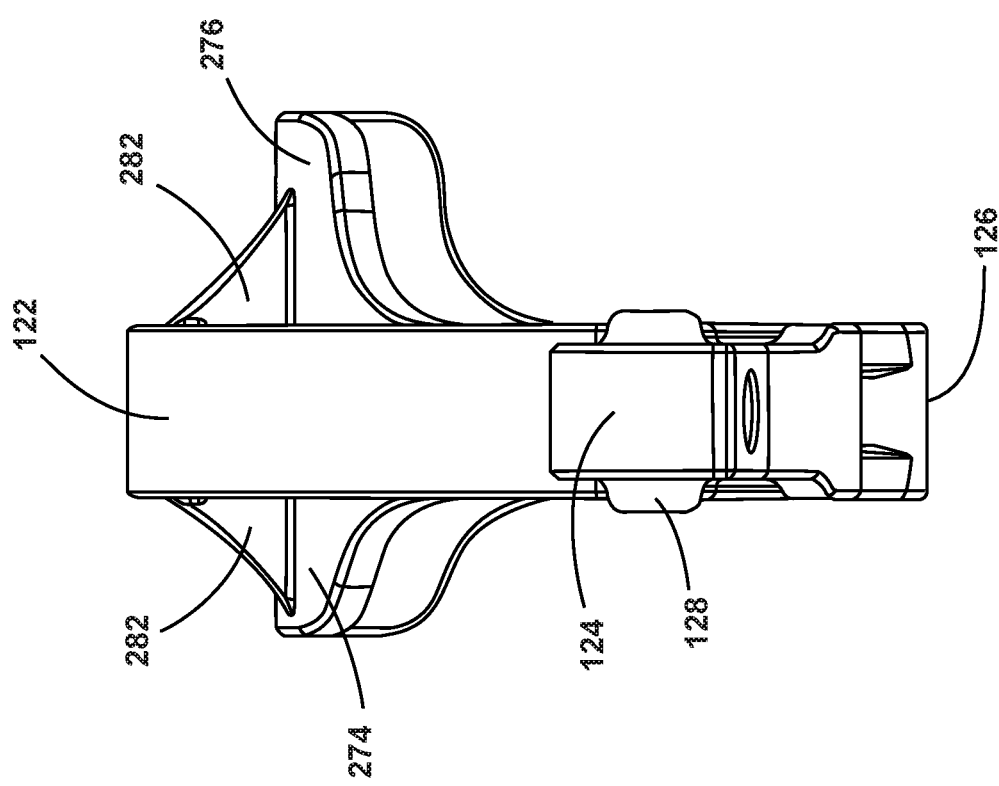
FIG. 24 is a front view of the bracket taken from the forward lever end.

Referring to FIGS. 24-25, front and rear views of the bracket 122 are shown, respectively. The front view of FIG. 24 includes the forward lever 124 with projection 128.

Referring to FIG. 25, the rear view of the bracket 122 includes the rearward portion 126.

Figure 27:
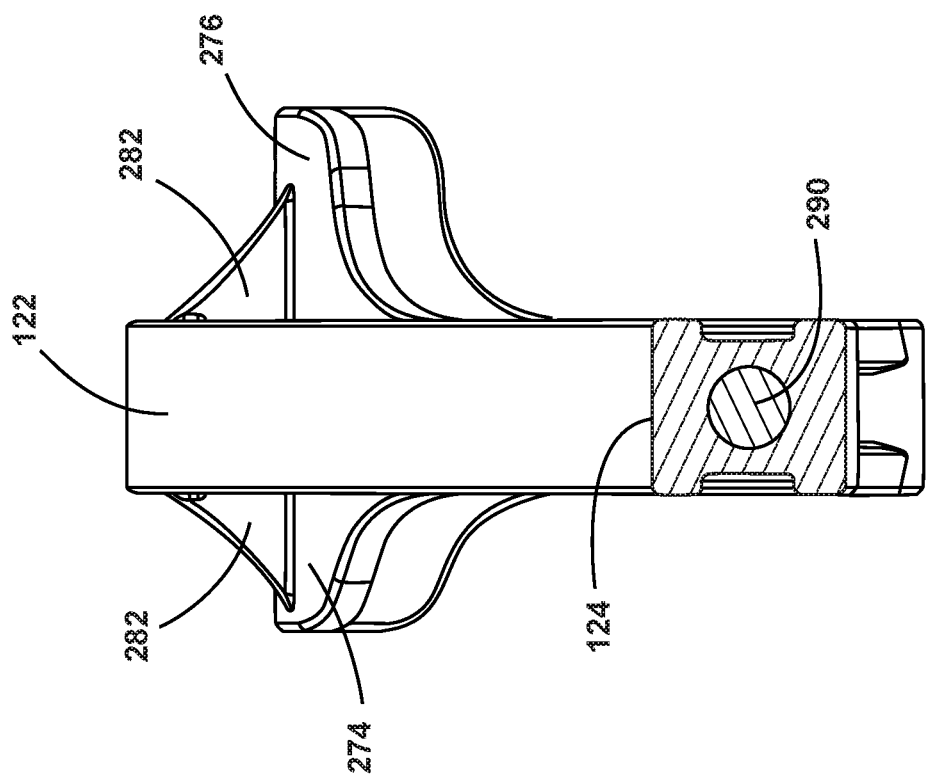
FIG. 27 is a cross-sectional view of the bracket of FIG. 26 taken along XXVII-XXVII of FIG. 26.
Figure 26:
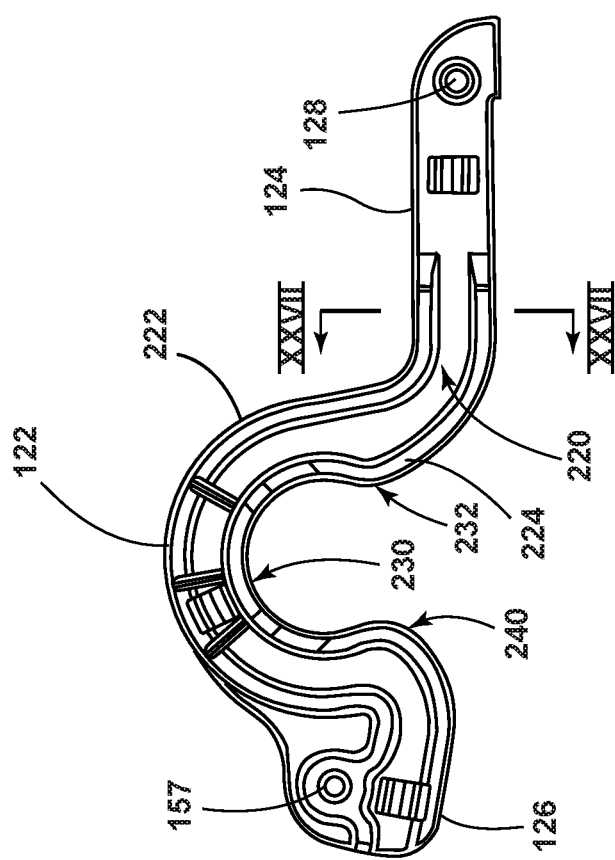
FIG. 26 is a second side view of the bracket.

Referring to FIG. 26, a second side view of the bracket 122 is shown. A cross section of the bracket 122 taken at lines XXVII-XXVII is shown in FIG. 27. In various aspects, the pivot bracket 122 is fabricated from glass-filled acetal and has a steel rod 290 running through the center.

Referring to FIG. 28, the pivot bar 48 is shown. The pivot bar 48 has a dimple 250. The pivot bar 48 also has a first end 252 and a second end 253. The first end 252 of the pivot bar 48 has ring like protrusions 254, 255, 256. The second end 253 of the pivot bar 48 has ring-like protrusions 262, 263. The dimple 250 has a first part 266 and a second part 268.

Referring to FIG. 29, a pair of pivot brackets 122 are on the pivot bar 48. The first pivot bracket 270 is located between the ring-like protrusion 256 and the dimple 250. The first pivot bracket 270 has a first flange 274 and a second flange 276. The first flange 274 abuts the ring like protrusion 256. The second pivot bracket 272 has a first flange 278 and a second flange 280. The second flange 280 abuts the ring-like protrusion 262. To place the first pivot bracket 270 and the second pivot bracket 272 on the pivot bar 48 during assembly of the seating assembly 10, the first pivot bracket 270 is slid over the dimple 250 and moved adjacent to the ring-like protrusion 256. Similarly, the second pivot bracket 272 is slid over the dimple 250 and moved adjacent to the ring like protrusion 262. In the depicted aspects, the pivot bar 48 is an elongated rod. In operation, the first pivot bracket 270 and the second pivot bracket 272 are operationally coupled to a location of the pivot bar 48 that has a constant diameter. Referring to FIGS. 28 and 29, in various aspects of the disclosure, the pivot bar 48 may have a first portion with a distance $D_2$ across the dimple 250 and a second portion with a diameter $D_3$. The diameter $D_3$ is greater than the distance $D_2$. The pivot brackets 122 are mounted on the elongated rod (pivot bar 48 in the depicted aspect) at the first portion with a first distance $D_2$ and moved to the second portion with the diameter $D_3$ for operation.

Figure 30:
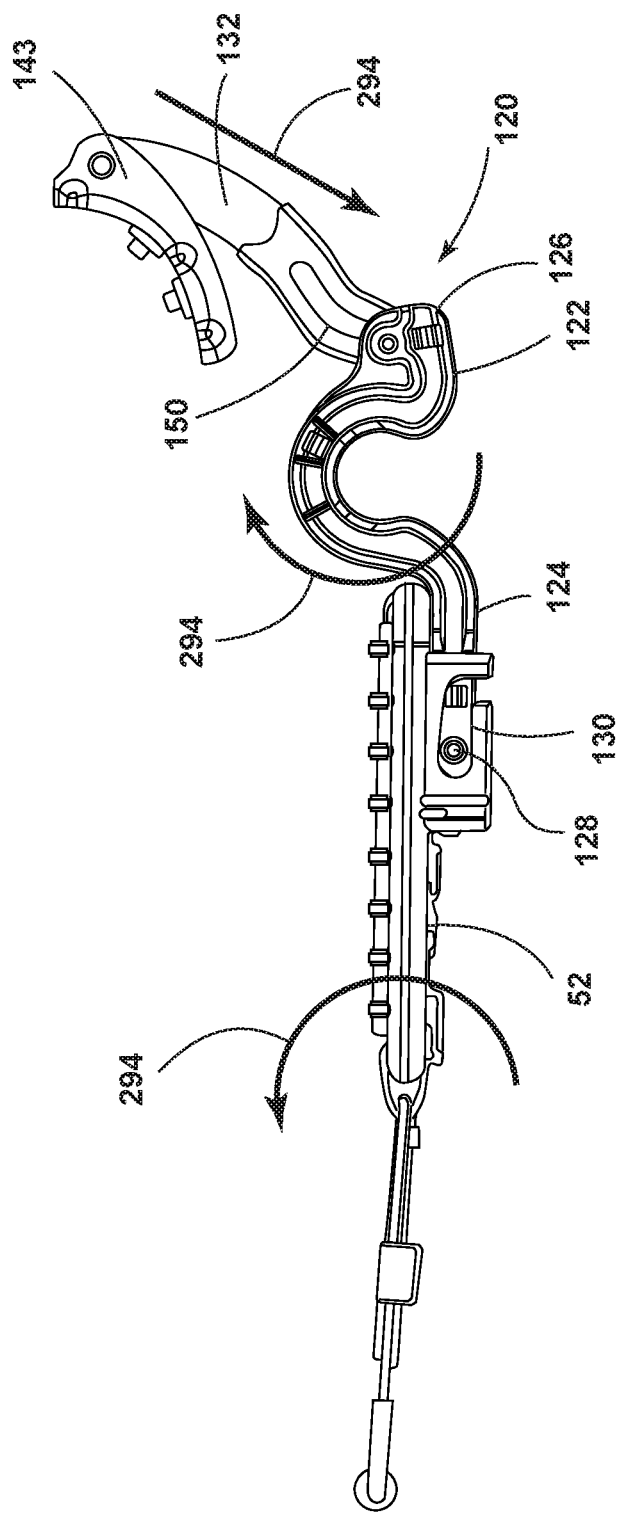
FIG. 30 is a side schematic view of the hip lifter mechanism with arrows to show the direction of motion when the hip lifter mechanism is activated.

Referring to FIG. 30, the hip lifter mechanism 120 is shown in a schematic view in an initial state in which the seatback 14 is upright. Arrows 294 depict the directions of motion when the hip lifter mechanism is activated from the seatback upright position towards the fully reclined position.

The SEATING ASSEMBLY WITH SUSPENSION is also disclosed in co-pending commonly assigned to Ford Global Technologies, LLC application Ser. No. 15/810,983, entitled SEATING ASSEMBLY PIVOT BRACKET the entire contents of which is hereby incorporated herein by reference in its entirety.

In various aspects of the disclosure, the seat suspension (exemplarily shown as the secondary suspension 52 in the depicted aspect) may be coupled to various types of lower seating structures that may or may not have underlying suspensions (exemplarily shown as the primary suspension 54 in the depicted aspect).

It is to be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lifter mechanism for an edge of a seat cushion comprising:
   a primary suspension coupled to a transverse bar;
   a secondary suspension pivotably coupled to the primary suspension and slidably coupled to a bracket rotatable about the transverse bar, wherein the bracket includes a forward lever coupled to a channel within a flange of the secondary suspension, and a rearward portion coupled to a linkage, wherein a collar portion of the bracket is disposed between the forward lever and the rearward portion, wherein the collar portion is rotatable about the transverse bar, wherein the linkage is coupled to a seatback, and wherein the forward lever raises an edge of the seat cushion upon the seatback pivoting to a predetermined reclined position.

2. The lifter mechanism of claim 1, wherein the secondary suspension comprises a frame and a mat, wherein each of the seat cushion and the seatback have an exposed surface and wherein the exposed surfaces of each of the seat cushion and the seatback substantially occupy the same horizontal plane when the seatback is in a fully reclined position.

3. The lifter mechanism of claim 2, wherein the linkage has a slot including an upper end and a lower end and wherein the rearward portion of the bracket is coupled to a pin received within the slot, wherein the lower end of the slot being proximate with the pin corresponds to an upright position of the seatback and wherein the upper end of the slot being in initial contact with the pin corresponds to the predetermined reclined position between the upright position and the fully reclined position.

4. The lifter mechanism of claim 3, wherein pivoting the seatback between the predetermined reclined position and a fully reclined position urges the upper end of the slot against the pin to rotate the bracket and raise the forward lever and the edge of the seat cushion upwardly.

5. The lifter mechanism of claim 4, wherein the forward lever is coupled to a projection and wherein the projection is slidably received within the channel of the secondary suspension.

6. The lifter mechanism of claim 1, wherein the secondary suspension is in a substantially horizontal position in the predetermined reclined position and wherein pivoting the seatback from the predetermined reclined position to a fully reclined position urges a projection to slide from a forward portion of a channel to a rearward portion of the channel to rotate a forward edge of the secondary suspension about a pivotable coupling to raise the rearward portion of the secondary suspension.

7. The lifter mechanism of claim 1, wherein the predetermined reclined position is about 55.5° relative to a vertical plane.

8. A seating assembly for a motor vehicle comprising:
   a lower seating structure further comprising a seat frame, a seat suspension disposed proximate the seat frame, a pivot bar laterally extending between rearward portions of the seat frame, and a lower seat pivot mount disposed at a rearward end of the seat frame, and a cushion assembly supported by the seat suspension;
   a seatback pivotable between an upright position and a fully reclined position operably coupled with the lower seating structure, wherein the seatback has a seatback pivot mount at a lower portion thereof that is operably coupled with the lower seat pivot mount; and
   a hip lifter mechanism further comprising a hip lifter pivot bracket operably coupled with and rotationally disposed relative to the pivot bar and a slotted linkage coupled to the lower portion of a seatback frame, wherein the hip lifter pivot bracket includes a forward lever and a rearward portion, wherein the forward lever of the hip lifter pivot bracket is operably connected to an edge of the seat suspension via a channel within a flange to raise the edge of the seat suspension upwardly upon the seatback pivoting to a predetermined reclined position between the upright position and the fully reclined position, and wherein a rearward portion is coupled to the slotted linkage.

9. The seating assembly of claim 8, wherein the seat suspension includes a pair of lateral opposed suspension frame members and a suspension cross member extending between the pair of lateral opposed suspension frame members, the pair of lateral opposed suspension frame members including nubs for securing a mat to the pair of lateral opposed suspension frame members.

10. The seating assembly of claim 9, wherein an inwardly extending member protrudes from at least one of the pair of lateral opposed suspension frame members and wherein the inwardly extending member is attached to the lower seating structure.

11. The seating assembly of claim 10, wherein the inwardly extending member includes a circular opening that is pivotably coupled to a circular member of the lower seating structure.

12. The seating assembly of claim 8, wherein the seat suspension includes:
   a suspension frame,
   a fastener coupled to the suspension frame wherein the fastener attaches the suspension frame to the lower seating structure, and
   a mat that is coupled to the suspension frame.

13. The seating assembly of claim 12, wherein the suspension frame has a rectangular shape and wherein the suspension frame includes nubs for receiving attachments of the mat.

14. The seating assembly of claim 13, wherein the suspension frame comprises a wire overmolded with a glass-filled nylon.

15. The seating assembly of claim 14, wherein the nubs are hook-shaped and formed of a glass-filled nylon.

16. The seating assembly of claim 8, wherein each of the lower seating structure and the seatback have an exposed surface and wherein the exposed surfaces of each of the lower seating structure and the seatback substantially occupy the same horizontal plane when the seatback is in the fully reclined position.

17. The seating assembly of claim 8, wherein the linkage includes a slot and the slot has an upper end and a lower end and the rearward portion of the hip lifter pivot bracket includes a pin received within the slot, wherein the lower end of the slot being proximate with the pin corresponds to the upright position of the seatback and wherein the upper end of the slot being in initial contact with the pin corresponds to the predetermined reclined position between the upright position and the fully reclined position.

18. The seating assembly of claim 8, further comprising a pair of hip lifter mechanisms, wherein each of the pair of hip lifter mechanisms is disposed proximate one of a pair of opposed lateral lower seat frame members.

19. The seating assembly of claim 8, wherein the hip lifter mechanism raises the seat suspension and the cushion assembly between 45 to 70 mm between the upright position and the fully reclined position of the seatback.

20. A seating assembly forming a substantially horizontal plane for an exposed surface of each of a lower seat cushion and a seatback cushion of a seatback comprising:
   a lifter mechanism for a rearward edge of the lower seat cushion further comprising a bracket pivotable about a transverse bar fixedly mounted to a frame assembly for a seat, the bracket comprising a forward lever operably connected to the lower seat cushion, and a rearward portion; and a link pinned at a first end to the seatback and pinned at a second end to the rearward portion;
   wherein the rearward edge of the lower seat cushion is initially raised by the forward lever upon the seatback pivoting to a predetermined reclined position and the rearward edge of the lower seat cushion is raised to the substantially horizontal plane upon the seatback pivoting to a fully reclined position.

* * * * *